(12) United States Patent (10) Patent No.: US 8,219,546 B2
Yan et al. (45) Date of Patent: Jul. 10, 2012

(54) MULTI-CORE SCHEDULING FOR PARALLEL QUERIES

(75) Inventors: Jianfeng Yan, Shanghai (CN); Jian Xu, Jiangsu Province (CN); Wen-Syan Li, Shanghai (CN)

(73) Assignee: SAP AG, Walldorf (DE)

( * ) Notice: Subject to any disclaimer, the term of this patent is extended or adjusted under 35 U.S.C. 154(b) by 318 days.

(21) Appl. No.: 12/758,604

(22) Filed: Apr. 12, 2010

(65) Prior Publication Data

US 2010/0312762 A1 Dec. 9, 2010

Related U.S. Application Data

(60) Provisional application No. 61/220,552, filed on Jun. 25, 2009.

(30) Foreign Application Priority Data

Jun. 5, 2009 (CN) .......................... 2009 1 0159572

(51) Int. Cl.
*G06F 17/30* (2006.01)
(52) U.S. Cl. ....................................... 707/716
(58) Field of Classification Search .................... 707/716
See application file for complete search history.

(56) References Cited

U.S. PATENT DOCUMENTS

| 7,509,646 | B1 | 3/2009 | Maw et al. | |
|---|---|---|---|---|
| 8,005,807 | B2 * | 8/2011 | Nouri et al. | 707/705 |
| 8,161,035 | B2 * | 4/2012 | Zhang et al. | 707/713 |
| 2008/0010642 | A1 | 1/2008 | Maclellan et al. | |
| 2009/0070511 | A1 | 3/2009 | Kaushik et al. | |

OTHER PUBLICATIONS

Extended European Search Report for EP Application No. 10005824. 7, mailed Nov. 30, 2010, 6 pages.
SAP, "User Manual: SAP DB", Version 7.3, Apr. 2002, 134 pages.
Bari, et al, "Enterprise workload manager z/os support", IBM Redpaper, Jul. 2005, 86 pages.
Cieslewicz, et al, "Parallel buffers for chip multiprocessors", In Proceedings of the Third International Workshop on Data Management of New Hardware, Jun. 15, 2007, 10 pages.
DeWitt, et al, "Parallel database systems: The future of high performance database systems", CACM, vol. 36, No. 6, Jun. 1992, 26 pages.
Graefe, "Volcano—an extensible and parallel query evaluation system", IEEE Transactions on Knowledge and Data Engineering, vol. 6, No. 1, pp. 120-135, Feb. 1994.

(Continued)

*Primary Examiner* — Cheryl Lewis
(74) *Attorney, Agent, or Firm* — Brake Hughes Bellermann LLP

(57) ABSTRACT

An operator manager may be configured to determine a number of available cores and to assign the cores among a plurality of operators of a query, the operators including a running set of operators through which a plurality of query paths exist. The operator manager may include a status monitor configured to determine the number of available cores and to determine the running set of operators, a critical path selector configured to determine a critical path of the query from among the query paths and the running set of operators, and a workload manager configured to assign a first core of the available cores to a running operator of the running set and of the critical path, and to thereafter receive a new critical path from the critical path selector and to assign a second core of the available cores to the running operator of the new critical path.

21 Claims, 8 Drawing Sheets

OTHER PUBLICATIONS

Gustafson, "Reevaluating amdahl's law", CACM, vol. 31, No. 5, May 1988, 3 pages.

Hardavellas, et al, "Database servers on chip multiprocessors: Limitations and opportunities", In CIDR, Sep. 2006, 13 pages.

Kwok, et al, "Dynamic critical-path scheduling: An effective technique for allocating task graphs to multiprocessors", IEEE Trans on Parallel and Distributed Systems, vol. 7, No. 5, pp. 506-521, May 1996.

Maheswaran, et al, "Dynamic matching and scheduling of a class of independent tasks onto heterogenous computing systems", In Proceedings of the 8th Heterogenous Computing Workshop (HCW99), pp. 30-44, Apr. 1999.

Mandel, et al, "Scheduling strategies for mapping application workflows onto the grid", In 14th IEEE Symposium on High Performance Distributed Computing Proceedings, pp. 125-134, Jul. 2005.

Mehta, et al, "Managing intra-operator parallelism in parallel database systems", In Proceedinos of the 21st International Conference on Very Large Data Bases, pp. 382-394, Sep. 1995.

Rahman, et al, "A dynamic critical path algorithm for scheduling scientific workflow applications on global grids", In Third International Conference on e-Science and Grid Computing Proceedings, pp. 35-42, Dec. 2007.

Vaupel, "z/OS Workload Manager", eSeryer Workload Management, Apr. 7, 2004, 28 pages.

Wieczorek, et al, "Taxonomies of the multi-criteria grid workflow scheduling problem", In CoreGRID Workshop on Grid Middleware Proceedings, Aug. 30, 2007, 21 pages.

Wilschut, et al, "Parallelism in a main-memory dbms: The performance of prisma/db", In Proceedings of the 18th International Conference on Very Large Data Bases, Aug. 1992, 16 pages.

Yu, et al, "Taxonomy of workflow management systems for grid computing", Journal of Grid Computing, 3(3-4), Sep. 2005, 33 pages.

Yu, et al, "Parallel query processing", In Advanced Database Systems, Lecture Notes in Computer Science 759 Springer, 1993, 47 pages.

* cited by examiner

MULTI-CORE SCHEDULING FOR PARALLEL QUERIES

CROSS REFERENCE TO RELATED APPLICATIONS

This application claims priority under 35 U.S.C. §119 to Chinese Patent Application No. 200910159572.3, filed Jun. 5, 2009, titled "MULTI-CORE SCHEDULING FOR PARALLEL QUERIES," and to U.S. Provisional Application No. 61/220,552, filed Jun. 25, 2009, titled "MULTI-CORE SCHEDULING FOR PARALLEL QUERIES," which are incorporated herein by reference in their entireties.

TECHNICAL FIELD

This description relates to multi-core query scheduling for parallel query execution.

BACKGROUND

The size of large databases and other software applications may be a limiting factor in the usefulness of such applications, particularly when queries and other manipulations of the applications/data are themselves long and complex. For example, a user may wish to issue a complex query to obtain results from a relational database having many thousands or millions of records, in which case a response time to provide corresponding query results may be unacceptably long. Moreover, such scenarios may lend themselves to inefficient use of available computational resources, e.g., by allowing over-consumption of resources by one user with respect to other current users.

Availability of multi-core (e.g., multi-CPU) computing systems have facilitated the development of parallel query execution as a way to mitigate such concerns. For example, by using two available cores, multiple queries (and/or multiple portions thereof) may be computed in parallel with one another. Consequently, for example, two equivalent queries may be executed in less than double the time it would take to execute one of the queries.

Implementation of such parallel queries, however, is difficult to accomplish in an efficient or optimal manner. For example, there may be costs associated with splitting/assigning multiple queries to the multiple cores, as well as costs associated with re-joining or merging the results of the queries. Depending, e.g., on the nature of the queries in question and the extent of the parallelization, such costs may limit, and may ultimately dominate or overwhelm, the benefits of the parallelization.

Moreover, complexity and unpredictability of a runtime environment of one or more running queries may exacerbate the difficulties of multi-core parallel query processing. For example, even if an acceptable plan for query parallelization is formulated prior to runtime of a query (or queries) in question, it may occur that runtime events may occur which reduce the efficacy or desirability of the planned query schedule (for example, when processing cores have substantially greater or lesser runtime availability than anticipated).

Thus, effective scheduling of multi-core processing of parallel queries (or portions thereof) is a difficult and non-trivial challenge. Failure in this regard may substantially limit an efficacy of available computing resources and a productivity of available human resources.

SUMMARY

According to a first general aspect, a system including instructions recorded on a computer-readable medium may include an operator manager configured to determine a number of available cores and to assign the cores among a plurality of operators of a query, the operators including a running set of operators through which a plurality of query paths exist. The operator manager may include a status monitor configured to determine the number of available cores and to determine the running set of operators, a critical path selector configured to determine a critical path of the query from among the query paths and the running set of operators, and a workload manager configured to assign a first core of the available cores to a running operator of the running set and of the critical path, and to thereafter receive a new critical path from the critical path selector and to assign a second core of the available cores to the running operator of the new critical path.

Implementations may have one or more of the following features. For example, the critical path selector may be configured to determine the critical path including summing operator execution times of operators of each query path, and thereafter selecting the critical path as having a largest summed execution time of the query paths. The critical path selector may be configured to determine the new critical path by re-calculating summed operator execution times for each query path after the assignment of the first core to the running operator of the running set and of the critical path, and selecting the new critical path as having the largest summed execution time of the query paths. The critical path selector may be configured to determine the new critical path including calculating summed operator execution times for each query path after the assignment of the first core to the running operator of the running set and of the critical path, determining a potential critical path for assignment of the second core to a running operator of the running set and of the potential critical path, the potential critical path having the largest summed execution time of the query paths, determining from the workload manager that the assignment of the second core to the running operator of the running set and of the potential critical path would not provide a net benefit in the execution time thereof, and determining the new critical path as having the second-largest summed execution time of the query paths.

The workload manager may be configured to assign the first core including determining from a reduction function of the running operator of the running set and of the critical path that the assignment of the first core will result in a net reduction in execution time thereof. The operator manager may be configured to continue to assign the available cores to the running operators of the query paths until the workload manager determines that, according to reduction functions of the running operators, assignment of any available core to any of the running operators would not result in a decrease in the execution times thereof. The status monitor may be configured to detect a state change including a newly-available or unavailable core, a start or completion of a running operator of the query, and may be configured to stop or start operations of the operator manager based on the state change.

The system may include a query manager configured to determine a plurality of queries, including the query, wherein the query manager includes a query selector configured to determine a total number of available cores and configured to assign the available cores of the total number of available cores to the operator manager for parallel processing of the query therewith, and a query monitor configured to monitor the plurality of queries to determine a state thereof.

In this case, the query selector may be configured to determine a tree shape associated with the plurality of queries and to determine a multi-query processing algorithm based thereon and on the total number of available cores. The query selector may be configured to implement the multi-query processing algorithm including a Shortest Remaining Job First (SRJF) algorithm, according to which the query monitor selects the query from the plurality of queries as having the shortest remaining time to finish, and the query selector assigns the available cores to the query for use by the operator manager in parallel processing thereof. The query selector may be configured to implement the multi-query processing algorithm including a Benefits Driven Balanced Critical Path (BD-BCP) algorithm, according to which a loop is executed in which the query monitor selects the query from the plurality of queries as having the largest benefit experienced from assigning a core thereto, and the query selector assigns a first core to the query, whereupon the loop continues with selection by the query monitor of a next query having the next largest benefit experienced from assigning a core thereto from the plurality of available cores.

According to another general aspect, a computer-implemented method may include determining a query including a plurality of operators, the operators including a running set of operators through which a plurality of query paths exist, determining a number of available cores, determining a critical path of the plurality of query paths, based on a total execution time of each of the plurality of query paths, assigning a first one of the available cores to a first operator within the running set and within the critical path, determining a new critical path through the plurality of query paths, based on the assigning, and assigning a second one of the available cores to a second operator within the running set and the new critical path.

Implementations may have one or more of the following features. For example, determining the critical path may include summing operator execution times of operators of each query path, and selecting the critical path as having a largest summed execution time of the query paths. Assigning the first one of the available cores may include determining from a reduction function associated with the first operator within the running set and within the critical path that assignment of the first one of the available cores thereto will result in a reduced execution time thereof.

Determining the new critical path may include calculating summed operator execution times for each query path after the assignment of the first one of the available cores to the first operator within the running set and within the critical path, determining a potential critical path for assignment of the second one of the available cores to a running operator of the running set and of the potential critical path, the potential critical path having the largest summed execution time of the query paths, determining that the assignment of the second one of the available cores to the running operator of the running set and of the potential critical path would not provide a net benefit in the execution time thereof, and determining the new critical, path as having a next-largest summed execution time of the query paths.

Determining the query may include determining the query from a plurality of queries, determining a total number of cores, and determining that the query has the shortest remaining time to finish of the plurality of queries, and assigning the available cores of the total number of cores to the query, based on the determining that the query has the shortest remaining time to finish. Determining the query may include determining the query from a plurality of queries, determining a total number of cores, projecting, for each of the plurality of queries, a benefit length associated with a reduction in query execution time as caused by the assignment of at least one core of the total number of cores to each query for processing therewith, assigning at least one core of the total number of cores to the query, based on the projecting, re-projecting the benefit length for each of the plurality of queries, based on the assigning, and assigning at least a second core of the total number of cores to the query, based on the re-projecting, the first and second cores of the total number of cores thus forming the available cores for the query.

According to another general aspect, a computer program product may be tangibly embodied on a computer-readable medium and may include instructions that, when executed, are configured to determine a query including a plurality of operators, the operators including a running set of operators through which a plurality of query paths exist, determine a number of available cores, determine a critical path of the plurality of query paths, based on a total execution time of each of the plurality of query paths, assign a first one of the available cores to a first operator within the running set and within the critical path, determine a new critical path through the plurality of query paths, based on the assigning, and assign a second one of the available cores to a second operator within the running set and the new critical path.

Implementations may have one or more of the following features. For example, the critical path may be determined by summing operator execution times of operators of each query path, and selecting the critical path as having a largest summed execution time of the query paths. The first one of the available cores may be assigned by determining from a reduction function associated with the first operator within the running set and within the critical path that assignment of the first one of the available cores thereto will result in a reduced execution time thereof.

The details of one or more implementations are set forth in the accompanying drawings and the description below. Other features will be apparent from the description and drawings, and from the claims.

DETAILED DESCRIPTION

Figure 1:
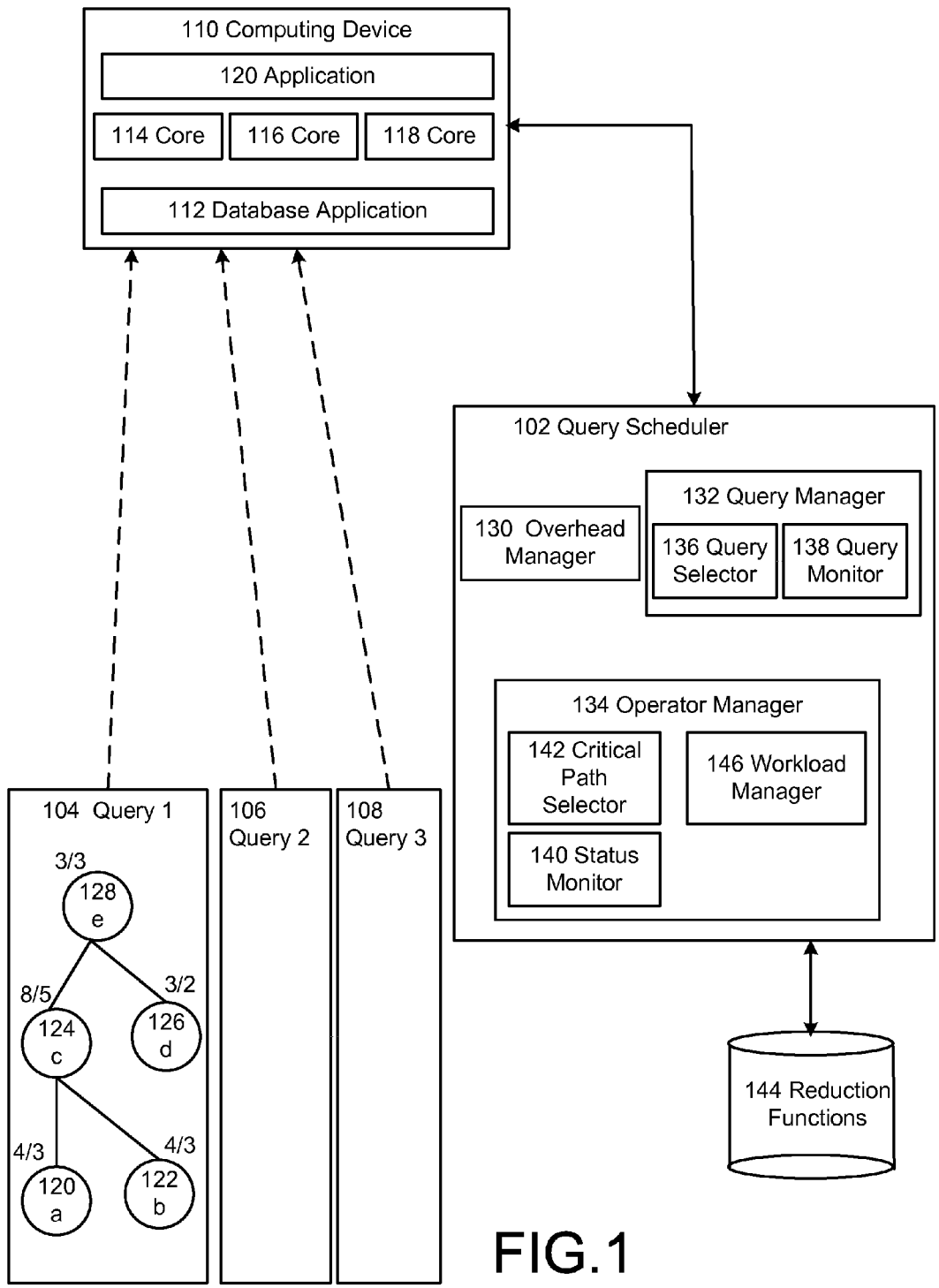
FIG. 1 is a block diagram of a multi-core query scheduling system for scheduling parallel queries.

FIG. 1 is a block diagram of a multi-core query scheduling system 100 for scheduling parallel queries. In the system 100, a query scheduler 102 is configured to schedule parallel execution of multiple queries 104, 106, 108, as well as of multiple portions (e.g., operators) of each individual query. The system 100 is able to provide for such parallel executions during runtime of the execution of the queries 104, 106, 108, in a way that takes advantage of available computing resources in an optimal and dynamic fashion, while minimizing or avoiding situations in which overhead associated with the parallelization(s) dominates or overwhelms the benefits thereof.

In FIG. 1, the query scheduler 102 is associated with a computing device 110 (e.g., may execute on, or in association with, the computing device 110). The computing device 110, which may represent more than one computing device, will be understood to be associated with known hardware and software components, which are therefore not necessarily described here in detail. For purposes of understanding the operations of FIG. 1, the computing device 100 is illustrated as containing or being associated with a database application 112, which may be understood to represent, e.g., any relational database and associated components (e.g., a database management system (DBMS), indices, tables, and/or actual data).

The queries 104, 106, 108 may thus be presented to the database application 112 in order to obtain query results therefrom. In this context, it may be appreciated that the term query is used generally to refer to virtually any job that may be executed in parallel by the computing device 110 using the database application 112 or other corresponding application. For example, rather than retrieving data from a database, the queries 104, 106, 108 may represent queries or other jobs requesting execution of a calculation by an application which would then return results thereof. Other such uses and examples would be apparent from the field(s) of parallel computing, and are not necessarily discussed herein, so that it should be understood that the examples that are provided are included merely for the sake of illustration and example, and therefore should not be considered limiting.

The computing device 110 is illustrated as including a plurality of cores 114, 116, 118. In this regard, the term core(s) should be understood to refer to, or include, an multi-computing platform in which a plurality of processors, central processing units (CPUs), or other processing resources are available, including network/device clusters. For example, parallel query processing is known as an option for improving database performance on existing SMP/CMP (Symmetrical Multi-Processing/Chip-level Multi-Processing) servers, particularly for high performance database systems which are able to process huge volumes of data and complex queries efficiently. Thus, in the present description, it should be appreciated that the term core represents a unit(s) of processing power within any such environment in which multiple processing options are available.

Within such environments, it is known that the cores 114, 116, 118 may be dynamically assigned to a plurality of applications or tasks thereof. For example, in FIG. 1, a separate application 120 is shown in order to illustrate the point that the cores 114, 116, 118 may be assigned within and among the applications 112, 120 (or tasks thereof). For example, at a given time, the cores 114, 116 may be assigned to the database application 112, while the core 118 may be assigned to the application 120. In such an example, it may be that the tasks of the database application 112 are considered more important or more time-critical than those of the application 120, so that the two cores 114, 116 are assigned thereto in order to expedite processing of the tasks of the database application 112 (e.g., processing of the queries 104, 106, 108).

In particular, each of the queries 104, 106, 108 may include a plurality of operators, such as the operators 120-128 of the query 104. Such operators may represent various query operations related to the database application 112 (such as, e.g., a "select" operation for selecting data therefrom, or a "join" operation for joining data thereof, where further examples and explanation of such operations are provided in more detail, below). The operators may be formed into a tree having a characteristic shape which reflects an underlying nature and structure of the query. More detailed examples and explanations of such operator trees are provided below.

In the example above, one or both of the cores 114, 116 may be assigned to the query 104 (i.e., to the operators 120-128 thereof). Generally speaking, as just described, it may be expected that assigning both cores 114, 116 to a particular operator/task, such as the operator 120, will result in that operator completing more quickly than assigning just one of the cores 114 or 116 thereto. For example, each operator 120-128 is illustrated with a number pair representing the two possibilities of one or both cores 114, 116 being assigned to the corresponding operator. Thus, the operator 120 is shown with the number pair 4/3 which indicates completion thereof in 4 time units with just one core 114 assigned thereto, and completion thereof in 3 time units with two cores 114, 116 assigned thereto. Similarly, number pairs 4/3, 8/5, and 3/2 for operators 122, 124, 126, respectively indicate the benefit of assigning both cores 114, 116 to each operator.

As referenced above, however, the general presumption that assignment of more cores will result in faster processing of a task may not always be true. For example, the operator 128 is illustrated with the number pair 3/3, which represents that the operator 128 takes 3 time units whether one or both cores 114, 116 is/are assigned thereto. In such a case, it is apparent that assignment of a second core to the operator 128 is neutral at best, and in general would represent a potential waste of effort and computing resources that might be better utilized elsewhere (e.g., using one of the cores to process the query 106, or tasks of the application 120).

There are a number of potential reasons as to why execution time of an operator does not generally decrease in direct or linear proportion to a number of cores assigned thereto (e.g., doubling the number of assigned cores results does not result in a halving of the execution time). Examples of such reasons are discussed in more detail, below. In general, one potentially significant reason relates to computational overhead associated with configuring and executing the parallel processing of the operator in question, e.g., the operator 120.

In this regard, the query scheduler 102 is illustrated as including an overhead manager 130 which is configured to configure and execute the parallel processing of, e.g., the operator 120, using, e.g., the cores 114, 116. For example, in order to assign the two cores 114, 116 to the operator 120, some of the operations or calculations of the operator 120 must be assigned to the core 114, while others are assigned to the core 116. However, due to being within the single operator 120, such operations may be dependent on one another, so that, e.g., decisions must be made about which operations are assigned to which core, and/or how the operations are split from, and ultimately merged back into, the operator 120. Such partitioning must generally be tracked and managed in order to ensure a satisfactory result. Further, such splitting/tracking/merging of parallel operations may occur differently depending on a relevant system architecture (e.g., of the computing device 110) and/or depending on a nature of the operator 120 in question.

To give some specific examples, it is well known in relational database systems that there are a number of operators for data processing, each of which can be parallelized in one or more ways. For example, for a 'select' operator, the data table may be partitioned into several partitions and selection can be processed on these partitions in parallel. Results from these partitions may then be assembled together for output. If the table is range-partitioned on the attribute(s) in selection conditions, only a subset of the partitions need to be processed. For a 'sort' operator, the table may be simply partitioned first and each partition sorted locally and then a mergesort may be applied to gain the final result. This may result in a considerable overhead in the merging phase. For a 'project' operator, projection without duplicate elimination may be performed when all data are selected in parallel. If duplicate elimination is required, duplicates can be eliminated as soon as they are found in parallel sorting. For a 'join' operator, a number of parallel join algorithms exist, many of which share the idea of partitioning the two join tables consistently and then joining the corresponding partitions in parallel. As a final example operator, for the 'aggregate' operator, the table may also be partitioned and the aggregation computed locally on each partition. Then, results from each partition may be assembled to compute the final result.

As shown in the above discussion, most of the database operators can be parallelized in a partition-and-merge fashion. As described, although executing an operator in parallel has the potential benefit of reducing the overall execution time, the overhead due to parallelization can offset the benefit when the operator is over parallelized. The overhead, as managed by the overhead manager 130, may be primarily due, e.g., to: (1) startup cost (i.e. the time needed to start a parallel operation), (2) termination cost (i.e. the time needed to end a parallel operator, such as merging results), and (3) synchronization cost (i.e. the time needed for each parallel process to synchronize with each other). Generally, higher degree of parallelism may result in more severe resource contention, degrading the parallel performance significantly.

As a matter of terminology, the assignment of multiple cores to a single operator, and resulting parallelization of the operations of the operator including associated overhead management, is referred to as intra-operator parallelization. Such intra-operator parallelization may be contrasted with inter-operator parallelization, in which, as described in detail below, available cores are assigned to as many running operators as possible. For example, instead of assigning the two cores 114, 116 to the operator 120 (intra-operator parallelization), the query scheduler 102 may assign the core 114 to the operator 120, and, meanwhile, assign the core 116 to the operator 122 (inter-operator parallelization).

As explained in detail below, the query scheduler 102 is configured to determine whether, when, and how to assign some or all of the cores 114, 116, 118 to the one or more of the queries 104, 106, 108, and, once assigned, whether and how to use one or both of intra and/or inter-operator parallelism within an individual query (e.g., the query 104). That is, in addition to making such determination(s) with respect to the individual query 104, the query scheduler 102 may be configured to assign the cores 114, 116, 118 within and among the queries 104, 106, 108 themselves. The assignment of cores 114, 116, 118 among separate queries (as opposed to among the operators of a single query) is referred to herein as inter-query parallelism.

Thus, the query scheduler 102 includes a query manager 132 for managing inter-query parallelism, and an operator manager 134 for managing intra-query (e.g., intra-operator and/or inter-operator parallelism). For example, the query manager 132 may be responsible for determining that of the three cores 114, 116, 118, two cores 114, 116 should be assigned to the query 104, one remaining core 118 to the query 106, and no cores to the query 108 (until at least one of the other queries 104, 106 is finished or until more cores become available). In another example, the query manager 132 may assign all three cores to the query 104 until finished, then may assign all three cores to the query 106 until finished, and then to the query 108 until the group of queries 104, 106, 108 is completed.

Of course, other example combinations than these are possible, but in general and as explained below, the query manager 132 may be responsible for assigning the cores 114, 116, 118 so as to minimize an average response time (or achieve some other performance metric) of the query group 104, 106, 108, as a whole. Consequently, a query selector 136 may be responsible for selecting which query 104, 106, 108 receives which (and how many) of the cores 114, 116, 118. A query monitor 138 monitors the queries and notifies the query selector 136 when additional action is needed. For example, if the query plan of the query manager 132 is to assign all cores 114, 116, 118 to the query of the queries 104, 106, 108 which has the shortest remaining time to completion, then all cores 114, 116, 118 might initially be assigned to the query 104. The query monitor 138 would then monitor the execution of the query 104 and detect when the query 104 is finished, at which point the cores 114, 116, 118 may be freed and the query selector 136 may determine that the query 108 then has the shortest remaining time to completion and therefore assign the cores 114, 116, 118 to the query 108. Further description and examples of the operations of the query manager 132 are provided below, e.g., with respect to FIG. 2.

During the time that the query selector 136 has assigned some or all of the core(s) 114, 116, 118 to a given query, such as the query 104, the operator manager 134 is responsible for assigning the available cores within and among the operators of that query (e.g., the operators 120-128 of the query 104). For example, if the query selector 136 assigns the cores 114, 116 to the query 104, and assigns the core 118 to the query 106, then the operator manager 134 may be configured to assign the cores 114, 116 within and among the operators 120-128 of the query 104.

Such assignment by the operator manager 134 of the cores 114, 116 (or other available cores) within and among the operators 120-128 of the query 104 may occur as a combination of the above-referenced intra and inter-operator parallelism(s). It may be observed from the above explanation that assigning more cores to an operator in this context may substantially reduce an execution time thereof (e.g., the operator 124 is illustrated as having an execution time reduced from 8 time units to 5 time units when the second core 116 is assigned thereto). On the other hand, such assignment of an increasing or increased number of cores, due to parallelization overhead and other possible reasons, may not result in any corresponding reduction of execution time of that operator (such as the operator 128, which takes 3 time units to execute regardless of whether one or two cores is/are used).

Extending this concept, it is apparent that assignment of multiple cores to a single operator may, at some point, actually become counter-productive and result in a longer, not shorter, execution time for that operator. For example, again with reference to the operator 128, it may be observed that assigning the third core 118 might easily result in an increase of the execution time of the operator 128 to 4 time units. Again, this may be due to the fact that computational considerations related to the parallelization overhead of parallelizing the operator 128 may overwhelm any benefit of dedicating the additional core(s) to the processing thereof.

Figure 3:
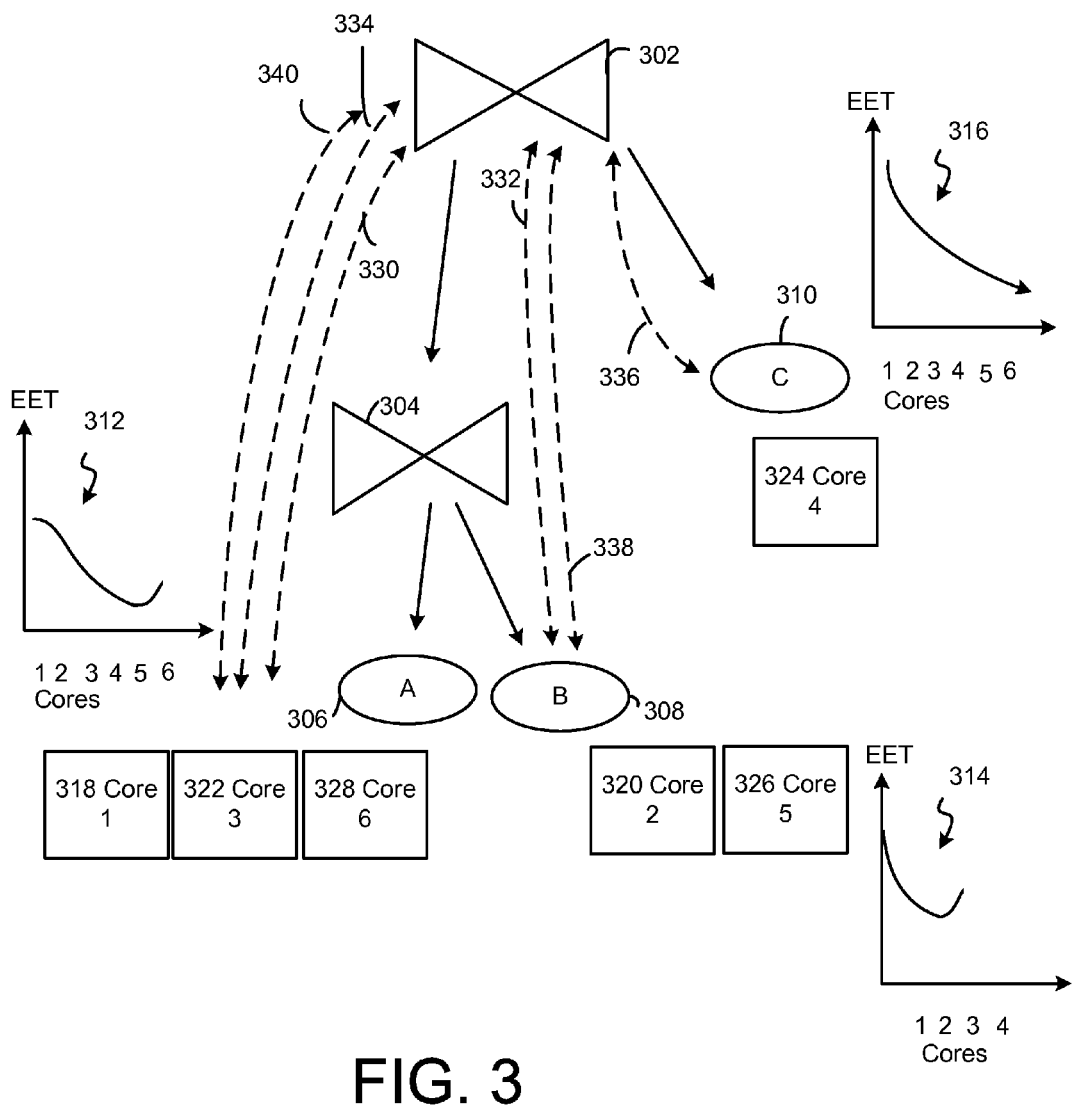
FIG. 3 is a block diagram illustrating an example scheduling function for operators of a query, using the system of FIG. 1.

In the present description, such a relationship between an execution time of an operator and a number of cores assigned thereto is referred to herein as a reduction function $f_{op}(n)$ for that operator, so that for the operator in question, an estimated execution time EET=$[T][f_{op}(n)]$ for a given number "n" of cores, where T represents a time needed to execute the operator with a single core of n=1. Thus, a reduction of execution time (or lack thereof) of an operator is expressed as a function of the number of course assigned thereto. Consequently, for the three factors of operator execution time EET, number of cores "n," and reduction function $f_{op}(n)$, it should be apparent that any two of these three factors may be used to deduce the third. The reduction function for a given operator may be determined empirically, or may be deduced in some circumstances from knowledge of the operator in question, the relevant system architecture, and other characteristics that impact the reduction function. Characteristics and examples of such reduction functions are discussed below, and example reduction functions for different corresponding operators are shown in FIG. 3.

In addition to implementing intra-operator parallelism, the cores 114, 116, 118 and the query scheduler 102 may be used to implement inter-operator parallelism, as referred to above. In such a case(s), a plurality of cores are assigned to as many different (running) operators as possible at a time. Thus, in FIG. 1, as discussed above, assigning two cores 114, 116 to the operator 120 and none to the operator 122 (at least, not until the operator 120 finishes) would be an example of intra-operator parallelism. In contrast, assigning the two cores 114, 116 by associating one with the operator 120 and the other with the operator 122 provides an example of inter-operator parallelism. In both examples, the two cores 114, 116 are being used together in parallel, but in the first (intra-operator) example, the cores 114, 116 are used for the single operator 120 in question, while in the second (inter-operator) example, the two cores 114, 116 are applied respectively and separately to the two operators 120, 122.

These two different types of parallelism have different features and advantages/disadvantages, and so might be more or less suitable for minimizing execution time of a given query (i.e., of operators thereof). For example, in general, it may be appreciated that there is generally a tradeoff between intra-operator and inter-operator parallelism. Specifically, intra-operator parallelism is generally not restricted by the dependency between the operators. The overhead of the intra-operator parallelism, however, may increase as the degree of parallelism increases. Meanwhile, inter-operator parallelism may be significantly impacted by the shape of the query evaluation tree (e.g., linear tree or bushy tree, as described below with respect to FIGS. 5 and 7A/7B). For example, a linear tree can offer much less chance for parallel execution than a bushy tree. On the other hand, interoperator parallelism does not necessarily need frequent partitioning and merging, which makes the parallelism overhead relatively small.

Thus, intra-operator parallelism may suffer from parallelism overhead as described above. Meanwhile, inter-operator parallelism may suffer from the fact that paths through an operator tree of a query may only be executed as fast as the slowest path allows. In a simple example to illustrate the point, it may be appreciated that if three essentially parallel branches of an operator tree are each assigned a separate one of the cores 114, 116, 118, then the slowest of the branches will dictate the overall time of completion of the query, since even if the other two branches (and corresponding cores) complete quickly, the query as a whole will be forced to wait for the remaining/slowest path.

The example of the query 104 of FIG. 1 may illustrate some of the different features of implementing intra and/or inter-operator parallelism. For example, if the two cores 114, 116 are assigned to the query 104, and intra-operator parallelism is maximized, then both cores 114, 116 will be assigned to exactly one ready/running operator at a time. For example the cores 114, 116 may first be assigned to operator 120 and after operator 120 finishes, the cores 114, 116 may be assigned to operator 122, and then operator 124, and then operator 126, and then operator 128. The total execution time of the query 104 (as determined from the various associated number pairs) would thus be 3+3+5+2+3=16 time units.

Conversely, if inter-operator parallelism is maximized, then, as described above, the cores 114, 116 will be assigned to as many operators as possible at a time. For example, at the beginning, the two cores 114, 116 may be assigned to operator 120 and 122, respectively, and then to operator 124 and 126, respectively. At that point, only the operator 128 would remain and thus both cores would be assigned to the operator 128. The total execution time of the query 104 in this scenario would thus be 4+8+3=15 (where, in this calculation, operators 120, 122 took the same time to complete and the execution time of operator 126 is subsumed by the execution time of the operator 124, which is longer).

In a final example, both intra and inter-operator parallelism may be used in a hybrid fashion. For example, the two cores 114, 116 may be assigned to the operators 120, 122, respectively at first, and assigned both to the operator 124. After the operator 124 completes, the cores 114, 116 may be assigned to the operators 126 and 128 sequentially. The total execution time of the query 104 in this example is thus 4+5+2+3=14, which is the best of the three examples.

Thus, the above example(s) shows that the optimal execution time of a query such as the query 104 depends on not only the nature of the query plan (i.e., the execution time of each operator and the dependency between operators) but also the overhead of parallelizing a specific operator. That is, if an operator(s) is dependent on completion of another operator(s), then assigning cores among the dependent operators will only be as helpful as the execution time of the operator(s) on the slowest path. However, attempting to reduce the execution time of an operator on the slowest path by increasing the intra-operator parallelism of the operator(s) on the slowest path may be associated with sufficient parallelism overhead to offset or destroy the benefit of the parallelism of the slowest path, or of the query as a whole.

In this regard, the slowest path referenced above is an example of what is referred to herein as a critical path (or CP). More generally, such a critical path of a query is a set of operators within the query, forming a path from one of current running operators to the exit operator, of which the sum of computation costs is maximum. The length of a critical path CP (CPL) of a query may be used herein as the sum of individual estimated execution time of each operator of the CP within the query. Certain techniques for determining the estimated execution time(s) of each individual operator are known, and specific examples relevant to, or useful in the understanding of, the present description are provided below.

In practice of the operator manager 134, a status monitor 140 may be used to monitor a current status of the operators 120-128 of the query 104 and/or to determine a current status of the cores 114, 116, 118 (e.g., whether a given core is available at a given time). Thus, the status monitor 140 may be used to determine a currently running set (RS) of the operators 120-128. For example, in the query 104, it may occur that the operator 120 must complete before any other operators 122-126 might begin, in which case the operator 120 may be the only member of a running set. In another example, both the operators 120 and 122 may execute in parallel, so that both operators 120, 122 may be members of a currently running set (RS). When the status monitor 140 determines that one of the operators of a running set completes, then the status monitor 140 may determine a new running set that is reduced by at least the completed operator and that may be increased by any newly-beginning operator(s).

A critical path selector 142 may input information from the status monitor and determine a current critical path of the query in question. For example, as just referenced, the critical path selector 142 may determine each operator of a current running set, and, for each such operator, may calculate all possible paths to completion (e.g., to completion of the operator 128), using the estimated execution time (EET) for each operator of each path and assuming that for each non-running operator (i.e., members of a non-running set of operators) a single core is/will be assigned. Thus, it may be seen that, in a query with parallel threads of execution, it will occur at any given moment that zero or one operator will be running/executing within each thread. From each such running operator, a query path exists from there to the end of the query. Therefore, such a running set of operators may be used to define a plurality of query paths, from which the critical path is selected for executing the algorithm In FIG. 1, both operators 120, 122 may constitute members of a running set of operators, so that a first query path will exist from the running operator 120 to the end operator 128, and a second query path will exist from the running operator 122 to the end operator 128. The status monitor 140 may thus detect that these operators 120, 122 are running and that the cores 114, 116 are available for assigning within the query 104. Then, the critical path selector 142 may determine that the query path starting at the running operator 120 has the highest summed estimated execution time and is thus the critical path having an associated critical path length (CPL).

A workload manager 146 may then input the determined, current critical path (including information about operators 120, 122 that are members of the current running set and identification of the running operator 120 of the critical path). The workload manager 148 is then responsible for determining whether to assign an available core(s) to the current critical path (i.e., to the currently-running operator 120 thereof) so as to reduce the length (e.g., summed estimated execution time) of the current critical path. As referenced above, reducing the critical path length in this sense may have the largest or most-likely beneficial effect on the reduction of the execution time of the query 104 as a whole.

In assigning the core(s) to the current critical path, the workload manager 146 may rely on a reduction function of the running operator of the critical path. For example, the workload manager 146 may access a database 148 of reduction functions including a reduction function of the running operator 120 of the critical path. The workload manager 146 may thus determine whether assignment of an available core to the running operator 120 of the critical path will provide a reduction in the execution time of the running operator 120.

If so, the workload manager 146 may assign the available core to the running operator 120. If other cores remain to be assigned (as determined by the status monitor 140), then the critical path selector 142 may select a new critical path. In some scenarios, the previously-calculated critical path may still be the critical path even with the new assignment of the previously-available core (and associated reduction in execution time of the operator 120), so that the operator 120 may continue to be the running operator of the newly-determined (in this case, identical) critical path.

In other scenarios, however, the act of assigning the available core to the running operator 120 may reduce the length of the current critical path such that it becomes shorter, and another of the query paths through the operator tree of the query 104 becomes the critical path (e.g., the query path beginning with the operator 122). In either case, the workload manager 146 again performs its function of assigning the available core to the running operator of the newly-determined (e.g., same or different) critical path, if the corresponding reduction function dictates that such an assignment would provide a net benefit in the reduction of the execution time of the query 104. If, however, the reduction function dictates that assigning the available core to the running operator of the new critical path would maintain or increase an execution time of the running operator, then the critical path selector 142 may determine a second-best critical path and repeat the process for the associated running operator. Additional description and examples of the operations of the operator manager 134 are provided in more detail below, e.g., with respect to FIG. 3.

Thus, the above description of the operator manager 134 illustrates operations in which a critical path is determined and receives an available core(s), which then may create a new/different critical path, which itself may then be assigned an available core. This process repeats, e.g., as long as additional cores are available, or until no critical paths exist which will benefit from the addition of an available core. This process is thus referred to as using a balanced critical path (BCP), because it dynamically balances and optimizes a path(s) through the operator tree of the query in question.

Thus, the present description provides examples of a query scheduling framework for optimizing parallel query execution on multi-core systems. As described, the query scheduler 102 may be used to coordinate intra-operator, inter-operator, and inter-query parallelization at runtime, in order to accelerate overall response of the queries 104, 106, 108. The query scheduler 102 may be configured to determine how queries and query operators should be parallelized, as well as the execution sequences thereof. The query scheduler 102 may coordinate intra-operator, inter-operator, and inter-query parallelism at runtime to minimize overall average response time of the online arrival queries.

To achieve these goals, the operator manager 134 may be used to implement the described Balanced Critical Path (BCP) algorithm, so as to schedule single query parallel execution to minimize its response time. Further, strategies for scheduling execution of multiple queries may be implemented by the query manage 132 in order to Minimize their average response time. As described in more detail herein, the algorithm(s) and strategies described herein may be used to take into account the number of available cores in a runtime environment, as well as other factors, such as a shape of a query/operator tree as well as parallelization overhead.

Figure 2:
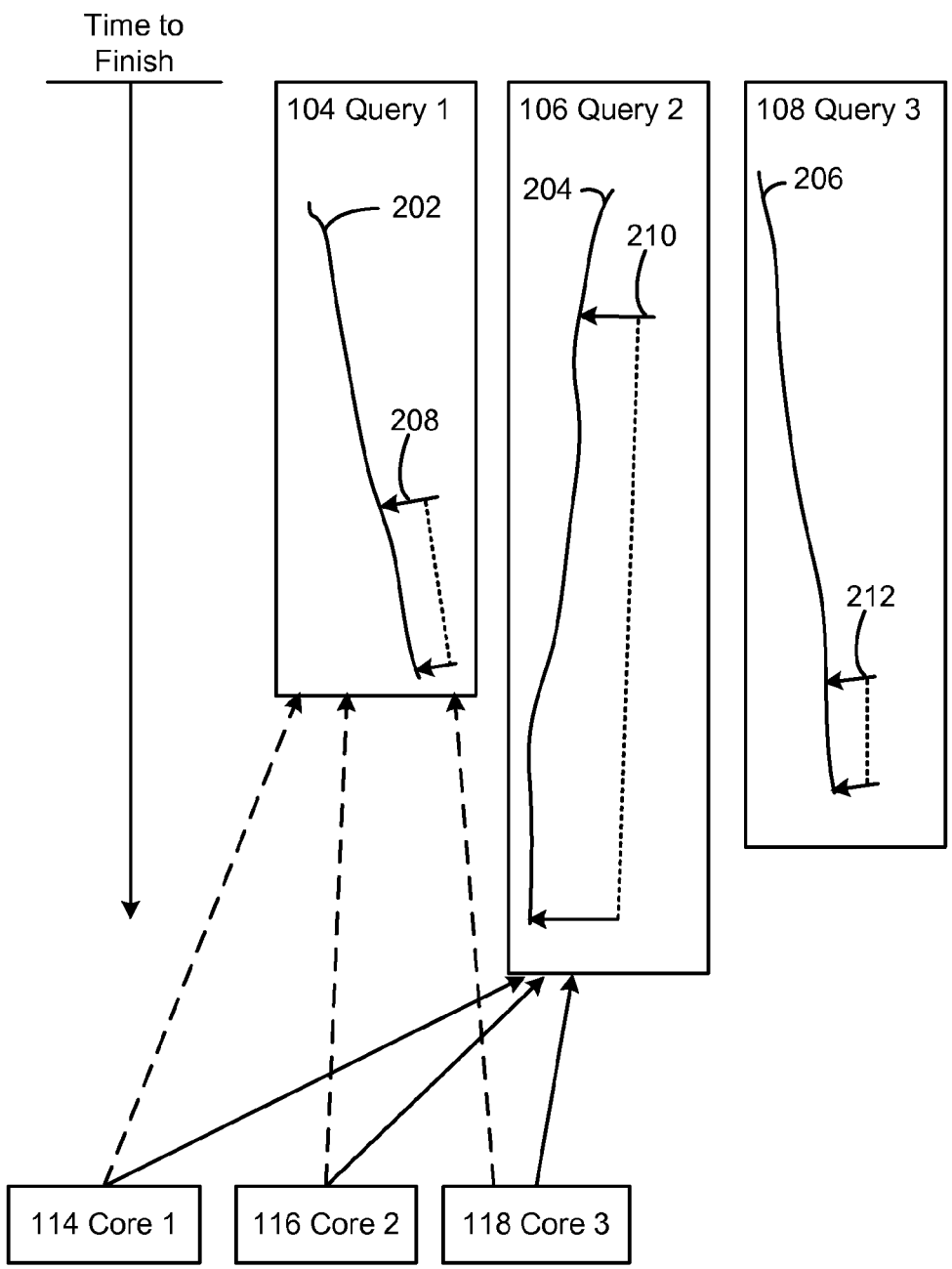
FIG. 2 is a block diagram of a plurality of queries to be executed by the system of FIG. 1.

FIG. 2 is a block diagram of a plurality of queries to be executed by the system of FIG. 1. Specifically, FIG. 2 illustrates the three queries 104, 106, 108 of FIG. 1 and the cores 114, 116, 118 that are to be assigned within and among the queries 104, 106, 108 by the query manager 132 as described herein.

In FIG. 2, the queries 104, 106, 108 are illustrated as having a remaining time to finish labelled as 202, 204, 206, respectively. As may be observed, the time to finish length 202 of the query 104 is shorter than the time to finish length 206 of the query 108, which in turn is shorter than the time to finish length 204 of the query 106.

Further in FIG. 2, each time to finish length 202, 204, 206 is illustrated as being associated with a benefit length 208, 210, 212, respectively. That is, the time to finish length 202 of the query 104 has a benefit length 208 that represents an extent to which addition of an additional core(s) to the execution of the query 104 will benefit (i.e., reduce) the time to finish of the query 104. In other words, as may be appreciated from the above discussion of FIG. 1, sometimes an addition of a core to an executing query (or operator thereof) may have a large beneficial impact, while in other cases such an addition may have no benefit, or may be detrimental. Thus, the benefit lengths 208, 210, 212 represent the net effects of adding one or more cores to each query (e.g., to a particular operator(s) of the query). As may be observed, the benefit length 212 is the smallest, while the benefit length 208 is larger, and the benefit length 210 is the largest, which represents, again, the fact that an addition of a core to the query 106 will have a large net benefit to the total completion time of the query 106.

In one implementation, then, the query selector 136 may assign cores to one or more queries using the shortest remaining job first (SRJF) algorithm. In this algorithm, as many cores as possible are assigned at once to a query which has the shortest time to finish length, which, in this case, is the query 104, as shown by the dotted lines connecting the cores 114, 116, 118 to the query 104. When the shortest remaining job (time to finish) is completed, the query monitor 138 so reports to the query selector 136, whereupon the query selector 136 may select a next-remaining shortest job, which in this case would be they query 108. Thus, the query selector 136 may assign all three queries 114, 116, 118 to the query 108 (assuming, for sake of simplicity in this example, that addition of this number of cores continues to reduce the execution time of the query in question and is not overridden by the detrimental effects of intra-operator parallelization overhead or other detrimental parallelization considerations).

In other implementations, the query selector 136 may use a benefit-driven balanced critical path (BD-BCP) algorithm in which the query selector 136 bases its decision on an extent to which an addition of another core(s) will benefit the query as a whole, so that whichever query will benefit the most at the time of a current core assignment will receive the available core(s). As is apparent from FIG. 2, the query 106 has the longest benefit length 210 and will thus, in the BD-BCP implementation, receive the cores 114. If the addition of the core 114 does not reduce the benefit length 210 at least smaller than the benefit length 208, then the next core, the core 116, will also be assigned to the query 106, and the same comment would apply thereafter if the benefit length 210 remains the longest and thus receives the final core 118, as shown by the lines connecting the cores 114, 116, 118 to the query 106. In other examples, if it turned out that one of the benefit lengths 208, 212 was longer than the (reduced) benefit length 210 after an assignment of core(s) thereto, then the corresponding query with the currently-longest benefit length would receive the available core(s).

Thus, for multiple queries, when the query scheduler 102 enables inter-query parallelism, the query scheduler 102 may consider how to schedule the queries effectively and may thus select between at least the two strategies/algorithms just described of SRJF and BD-BCP. In this regard, the SRJF strategy may minimize the overall average response time of multiple queries by feeding as many available cores as possible to the query which is estimated to be finished in the shortest time (e.g., the query 104), as just described. On the other hand, SRJF is very likely to result in high degrees of intra-operator parallelism, as more cores may be utilized to finish the shortest remaining job as soon as possible. Furthermore, as already described, higher degrees of intra-operator parallelism usually indicate higher parallelism overhead (as implemented/managed by the overhead manager 130). As described, if the parallelism overhead eventually dominates the benefit of parallelism, the response time will be even longer than without parallel execution. Thus, SRJF may not always be, the optimal choice.

In the presently-described examples, then, multiple queries are executed simultaneously, e.g., the executing queries are partially overlapped with other(s). In such scenarios, several different criteria may be used to judge the efficiency of the scheduling or optimizing algorithms. In the present examples, as already referenced, the average response time (ART) is used. The average response time of a query may generally include or refer to the interval between the time the query is issued and the time the query is completed. In this description, multi-query selection is described with reference to the minimizing of the ART, but it will be appreciated that the described techniques can also be applied to other appropriate criteria.

Thus, FIG. 2 illustrates two different strategies for considering inter-query parallelization. The query selector 136 may be configured to select between these two strategies when attempting to execute overlapping queries in parallel by assigning available cores thereto. In general, these techniques may relate, for example, to an extent of parallelism overhead that is likely to be associated with a query in question, and/or a shape of the query tree may be indicative of which strategy may be optimal. Further, a number of available cores may provide an indication of which strategy to select. The nature and use of such selection criteria for selecting between the two described multi-query selection strategies of SRJF and BD-BCP are described in more detail below with respect to FIGS. 5, 7a, and 7b.

FIG. 3 is a block diagram illustrating an example scheduling function for operators of a query, using the system of FIG. 1. For the example of FIG. 3, the query 106 is illustrated in detail, and it is assumed for the example that six cores are available. That is, it is assumed that at least 6 cores are available in the computing device 110, and that if other queries (such as the queries 104, 108) are present, that the query selector 136 (in accordance with FIGS. 2, 5, 7a/7b) has assigned at least 6 cores to the illustrated query 106. Then, within the query 106 itself, the operator manager 134 of FIG. 1 may be responsible for implementing the Balanced Critical Path (BCP) algorithm described above, in order to assign the 6 available cores to the various operators of the query 106.

More specifically, in FIG. 3, control operators 302 and 304 govern an order of execution of task operators 306, 308, and 310, as shown. The operator 306 is associated with a reduction function 312, the operator 308 is associated with a reduction function 314, and the operator 310 is associated with a reduction function 316. As shown, the reduction function 312 illustrates that the operator 306 experiences a reduction in execution time (shown as EET on the y-axis) each time that a first, second, third, fourth, and fifth core (shown as cores on the x-axis) are assigned thereto, but that addition of a sixth core (due to parallelization overheads) results in an increase of the execution time of the operator 306. Meanwhile, the reduction function 314 illustrates that the operator 308 experiences a reduction in execution time each time that a first and second core are assigned thereto, but that addition of a third core (due to parallelization overheads) results in an increase of the execution time of the operator 308. On the other hand, the reduction function 316 illustrates a steadily decreasing execution time of the operator 310 as cores are assigned thereto (indicating a minimal or non-existent parallelization overhead).

With respect to the various reduction functions 312, 314, 316, and in general, as described above, the reduction function $f_{op}(n)$ is provided herein as a coefficient that captures differences in execution time of an operator when running on different numbers of cores. That is, the reduction function of an operator describes the benefit of parallelizing the operator with different degrees of parallelism. The characteristic of the reduction function of an operator may depend on the system architecture (i.e. CPU/core speed, size and bandwidth of the memory, I/O speed, or whether cache is shared). These and related factors may decide the potential contention overhead of different degrees of parallelism. On the other hand, different kinds of operators may also behave differently when they are parallelized. This is due to the fact that the overhead of parallelizing an operator is also closely related to the nature of the operator. For example, parallel sorting may need either a pre-partitioning process or a post-merge-sort to obtain the correct final result, which introduces more startup and termination overhead than parallel selection. Even within the same operator, the reduction function may vary when the selectivity or the predicate is different. For example, a selection with a complex predicate is more computational intensive so that memory contention is alleviated. Such selection can thus be characterized by a different reduction function from without any predicate.

Taking the above and related considerations into account, it may be observed that when the query is compiled before execution, the reduction function of each operator may be estimated according to the system architecture, the type of the operator, and the potential resource utility/contention by the operator if it is parallelized in different degrees. The reduction function also may be determined by other methods. For example, one strategy may include tuning out the optimal number of parallel processors adaptively based on the profiling information. For example, if tentatively trying to add some processors to one parallelized operator can improve its performance, then it may be assigned permanently. Since the reduction function only owns one extreme value theoretically, the point of optimal number of parallel processors also may empirically be approached ideally.

In operation, then, the operator manager 134 may assign the cores 318-328 as follows. When the status monitor 140 determines that the operators 306, 308, 310 are in a ready-to-run state (assuming all may begin together and run in parallel), then the critical path selector 142 may determine query paths from each running operator 306, 308, 310 through the control operator 302, and may then select a critical from among these query paths.

As shown, a first such critical path is represented by critical path 330 beginning at the operator 306. Consequently, the workload manager 146 may assign a first core 318 to the running operator 306 of the critical path 330. Then, a new critical path 332 may be determined having a running operator 308, which may result in assignment of the core 320 thereto. Again a new critical path may be determined, this time being a critical path 334 which again has the running operator 306 so that the core 322 is assigned thereto.

Continuing the example, it may occur that assignment of the cores 318-322 as described may sufficiently reduce an execution time of the operators 306, 308 that a new critical path 336 beginning at the operator 310 is determined. Consequently, the core 324 may be assigned to the operator 310. This results in the existence of critical path 338 and assignment of the core 326 to the operator 308.

In a final example illustrated in FIG. 3, it may occur that even after assignment of the core 326 to the operator 308, the resulting critical path may continue to originate at the operator 308. In this case, however, the workload manager 146 may determine from the reduction function 314 that assignment of the last remaining core 328 to the operator 308 would result in the assignment of three cores 320, 326 and 328 thereto. However, the reduction function 314 illustrates that assignment of a third core to the operator 308 will result in an increase, not a decrease, in the execution time thereof.

In such scenarios, the workload manager 146 may determine from the critical path selector a next-best critical path, i.e., a next-longest or next-slowest critical path, which in this case results in the determination of a new critical path 340. As shown, this new critical path originates with the operator 306 and therefore the operator 306 receives the sixth and final core 328. Thus, it may be appreciated from this example and from the description herein that the term critical path in this description may refer both to an actual or literal critical path which is the longest path of the existing query paths through a query, and/or may include an effective critical path which is determined as a new critical path when an actual critical path is ruled out for assignment of an available core by virtue of that core's reduction function, as in the example just given.

Figure 4:
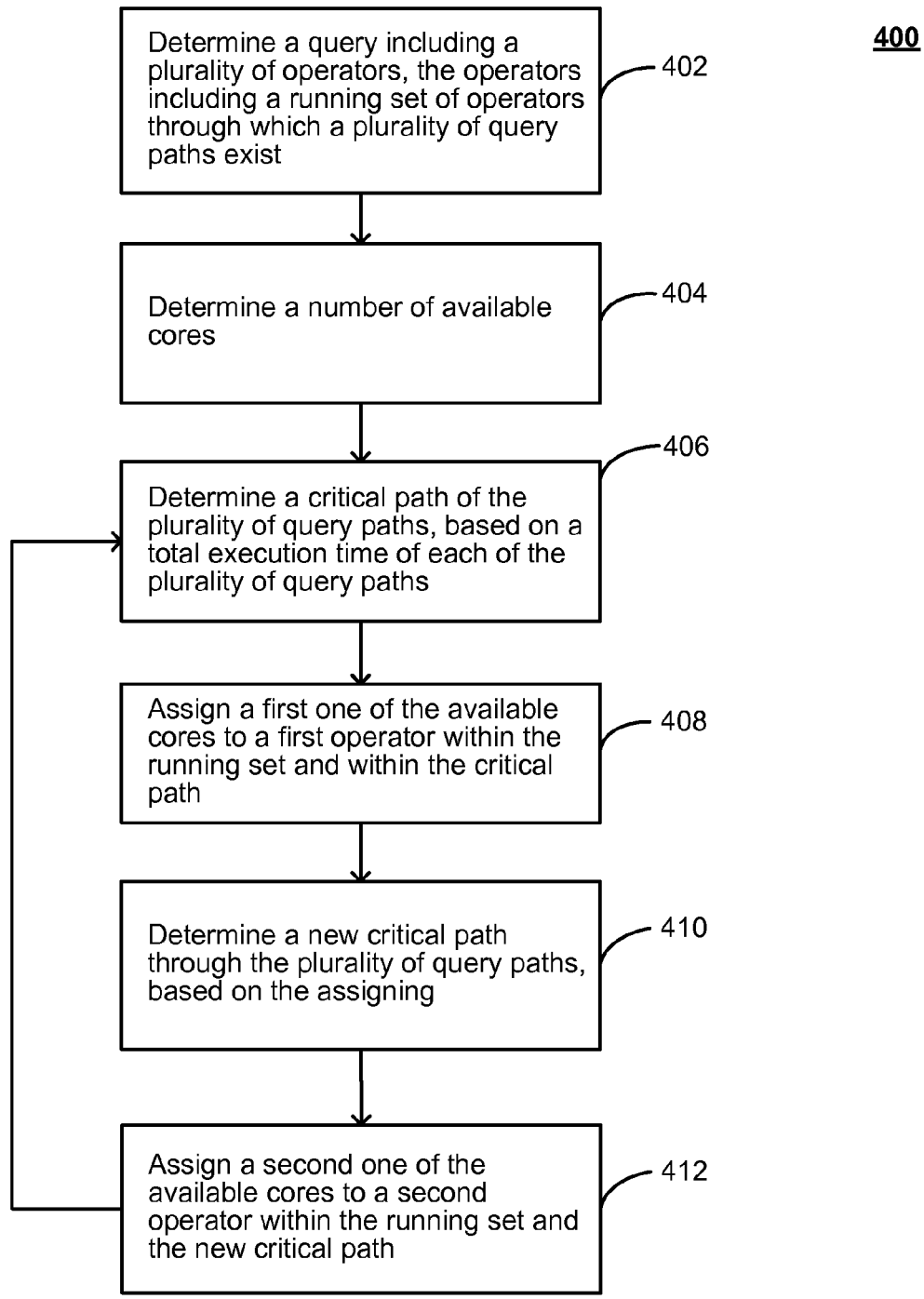
FIG. 4 is a flowchart illustrating example operations of the system of FIG. 1.

FIG. 4 is a flowchart 400 illustrating example operations of the system of FIG. 1. In particular, FIG. 4 illustrates example operations of the operator manager 134, which may be supplemented by operations of the query manager 132 as described herein (including with respect to FIGS. 5 and 7A/7B, below). Additional examples of the operations of the operator manager 134 are also provided below with respect to FIGS. 6 and 8A/8B.

In FIG. 4, a query including a plurality of operators may be determined, the operators including a running set of operators through which a plurality of query paths exist (402). For example, with reference to the examples of FIGS. 1 and 3, the operator manager 134 may determine the query 106. Specifically, the operator manager 134 may receive identification of the query 106 from the query manager 132 as being imminently or currently processed by the computing device 110 and the database application 112. As shown in FIG. 3, the query 106 may include 302-310, of which operators 306-310 form a running set (e.g., any or all of these are or may be running, without having to wait on completion of a previous operator(s)), so that example potential query paths 330/334/340, 332/338, and 336 exist through the query 106.

A number of available cores may be determined (404). For example, the operator manager 134 may determine from the query manager 132 that a certain subset of cores has been assigned for processing the query 106. For example, as in FIG. 3, when six cores 318-328 are available, it may occur that all six cores or some subset thereof will be available to process the query 106.

It may be appreciated that the status monitor 140 may be used to determine a current or imminent status of either the query 106 and/or the available cores. That is, the status monitor 140 may communicate with the query manager 132 to determine this information, and/or may interact directly with either the computing device 110/database application 112 and the query 106.

A critical path of the plurality of query paths may be determined, based on a total execution time of each of the plurality of query paths (406). For example, as described, the critical path selector 142 may select the query path 330 as the critical path because the total/summed estimated execution time of the individual operators of that query path is the largest/longest of all the query paths.

A first one of the available cores may be assigned to a first operator within the running set and within the critical path (408). For example, the workload manager 146 may assign the core 318 to the running/first operator 306 of the running set of operators 306, 308, 310 and within the critical path 330. As may be appreciated, in so doing, the workload manager 146 may ensure that the addition of the available core will, according to the relevant reduction function (e.g., 312), actually reduce an execution time of the running/first operator 306.

A new critical path through the plurality of query paths may be determined, based on the assigning (410). For example, due to the assigning of the previously-available core 318, the query path 332 may be determined to be the new critical path, as determined by the critical path selector 142 using the newly-estimated execution times of the query paths including the reduced execution time of the operator 306 now using the core 318.

A second one of the available cores may be assigned to a second operator within the running set and the new critical path (412). For example, the workload manager 146 may assign the core 320 to the running/second operator 308 of the running set of operators 306, 308, 310 and within the new critical path 332. As may be appreciated, in so doing, the workload manager 146 may again ensure that the addition of the available core will, according to the relevant reduction function (e.g., 314), actually reduce an execution time of the running/second operator 308.

As may be appreciated, this assignment process may continue until, e.g., all running operators are assigned a maximum number of cores according to their respective reduction functions, or until all available cores are assigned. The status monitor 140 may determine either or both of these conditions, and further may determine other status changes which may affect the operations of the operator manager. In the latter case, for example, the status monitor may determine a completion of the operator 306 (in which case all cores assigned thereto become available for re-assignment according to the operations of FIG. 4), or may determine that a new operator has begun to execute (and therefore may require cores to be assigned thereto according to FIG. 4), or may determine that new cores otherwise become available (e.g., such as when cores previously dedicated to the separate application 120 complete some task(s) associated therewith and consequently become available.

Although not explicitly described with respect to FIG. 4, it may be appreciated that after assigning the first one of the available cores to the first operator, the critical path selector 142 may determine a potential critical path and associated potential running operator of the running set; i.e., may determine the query path which actually/literally has the longest estimated execution time through the query 106. In such a case, it may occur that the workload manager 146, e.g., when assigning the second one of the available cores to such a potential critical path and associated potential running operator, may determine from the relevant reduction function that the assignment will not, in fact, result in a reduced execution time of the running/potential operator (such as the example of FIG. 3 described above in which the core 328 was to be assigned to the potential critical path 332/338 but which was prohibited due to the reduction function 314).

Thus, it may occur that only after such a determination may the critical path selector 142 select the new critical path and associated running operator that will actually receive the assignment of the available core (e.g., such as the new critical path 340 of FIG. 3 and the assignment of the core 328 to the running operator 306). Thus, as already explained, the term (new) critical path may refer to a query path which has the longest estimated execution time, and/or also may refer to or include a query path having the longest estimated execution time that will also benefit from assignment of an available core to a running operator thereof.

Figure 5:
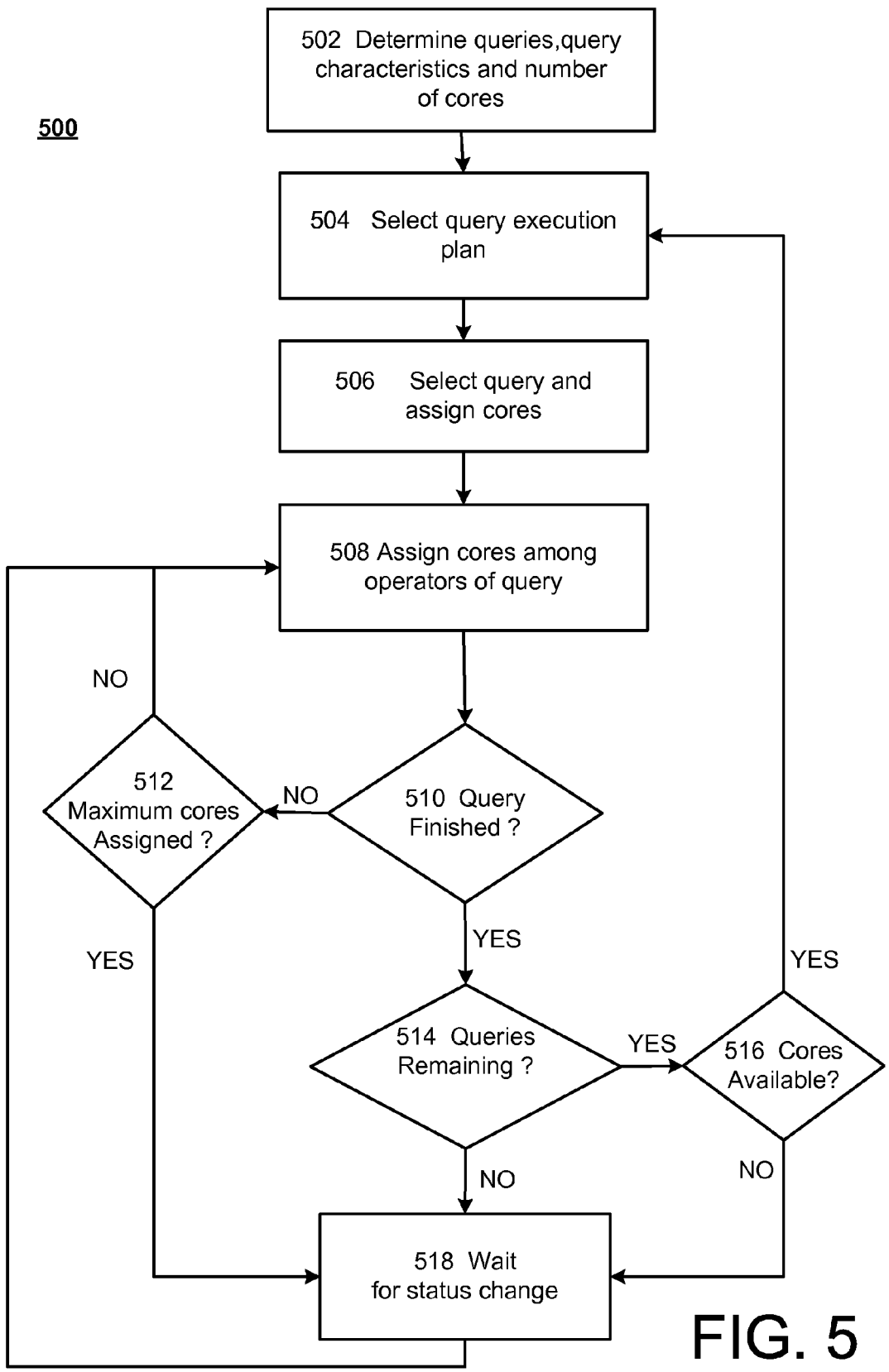
FIG. 5 is a flowchart illustrating example operations for executing the queries of FIG. 2, using the system of FIG. 1.

FIG. 5 is a flowchart 500 illustrating example operations for executing the queries of FIG. 2, using the system of FIG. 1. More particularly, FIG. 5 illustrates the operations of receiving multiple overlapping queries 104, 106, 108, while multiple cores are available for processing the queries 104, 106, 108 (e.g., at least the cores 114, 116, 118 and/or in additional or alternative examples, the cores 318-328 of FIG. 3). Thus, FIG. 5 illustrates the entire process of receiving the plurality of queries 104, 106, 108, determining which query (or queries) to process first, assigning core(s) thereto for processing using the intra-query processing techniques (e.g., the Balanced Critical Path techniques described herein with respect to FIGS. 1, 3, 4, 6, and 8), and repeating the process as needed until the queries 104, 106, 108 are completed.

Thus, in FIG. 5, the queries 104, 106, 108, query characteristics, and number of available cores (e.g., the cores 114, 116, 118) may be determined (502). For example, the query manager 132, e.g., the query monitor 138, may be used to determine some or all of these characteristics. In this context, the term query characteristics refers generally to attributes of the queries 104, 106, 108 which may be useful in deciding which inter-query processing technique to use (e.g., such as selecting between the shortest remaining job first (SRJF) algorithm and the benefit-driven balanced critical path (BD-BCP) algorithms described above).

For example, a shape of a query/operator tree of the query in question may be useful in this regard. In particular, if a query has a structure including numbers of serially-connect operators (thus likely to form lengthy critical paths), then application of the BD-BCP algorithm may be advantageous due to opportunities to benefit from reducing the critical path(s). In this regard, it may be appreciated that in such cases, using the SRJF algorithm may result in an excess number of cores being assigned to a query, in the sense that the parallelism overhead of multiple cores processing a given operator may mitigate/overwhelm/outweigh the benefit of the cores being assigned to that operator/query, as described above). Conversely, if the query has a structure without such serially-connected operators, then the SRJF algorithm may be relatively more useful, since the assigned cores may be assigned to different operators of the query and therefore are less likely to incur parallelism overhead. Further details of how the factors such as number of queries, number of cores, and query characteristics affect the query processing selection process are provided in more detail, below.

Thus, in FIG. 5, a query execution plan may be selected (504), based on the previously-determined factors, just referenced above. In the present examples, the two possible query processing plans are described as the SRJF and BD-BDP algorithms, although other possibilities exist, as well.

Based on the selected query processing plan (e.g., SRJF or BD-BCP), a query is selected and cores are assigned (506). For example, as shown in FIG. 2, if the SRJF algorithm is used then the query 104 may be selected and all three cores 114, 116, 118 (or all 6 cores 318-328 in the example of FIG. 3) may be assigned thereto in order to finish processing the query 104 as soon as possible. On the other hand, as shown in FIG. 3, if the BD-BCP algorithm is selected, then the available cores are assigned to the query 106 (since, as explained, the query 106 is shown as having the longest benefit length 210). The query manager 132 may be responsible for making these determinations and assigning the determined number of cores to the resulting query. Further examples and discussion associated with making such determinations are provided below with respect to FIGS. 7A and 7B. In general, though, it may be noted that the assignment of cores in the BD-BCP algorithm is under a relatively finer granularity, in which one core at a time is considered and assigned (or not) to a candidate query.

In contrast, in the SRJF algorithm, as many cores as needed may be assigned in bulk to one query in one step.

Once a number of cores is assigned to a query, then the operator manager 134 may be configured to assign the cores among the selected query (i.e., among the operators thereof) (508). For example, as described, the operator manager 134 may execute the example of FIGS. 3 and 4 of implementing a greedy algorithm according to the respective reduction functions of each operator. Further examples of the operations of the operator manager 134 are provided below with respect to FIGS. 6 and 8A/8B.

As long as the query in question is not finished (510) and the maximum number of cores has not been assigned (512), then the process of assigning cores among the operators of the query may continue (508). That is, if the workload manager 146 determines that all running operators of the query have reached a point where assignment of an additional core will fail to reduce (or will increase) the execution time thereof, then the workload manager 146 will determine that the maximum number of cores has been assigned to this query and will at least temporarily stop assigning cores to the operators thereof (and may release any available core(s) for use in processing other queries). Thus, if this condition is reached (512), then the status monitor 140 will continue to wait for a status change before proceeding (518), such as a completion of a running operator or query, a start of a previously-non running operator or query, or a newly-available core. If such a status change occurs, then the process may continue with assignment of cores among the query operators, as described (508).

On the other hand, once the query finishes (510), then if there are no more queries remaining (514), then again a status change may be awaited (518). If queries are remaining (514) but no cores are available (516), then again a status change may be awaited (518). However, if the queries are remaining (514) and cores are available (516), then the process may continue with the previously (or newly)-selected query execution plan (e.g., SRJF or BD-BCP) (504).

Figure 6:
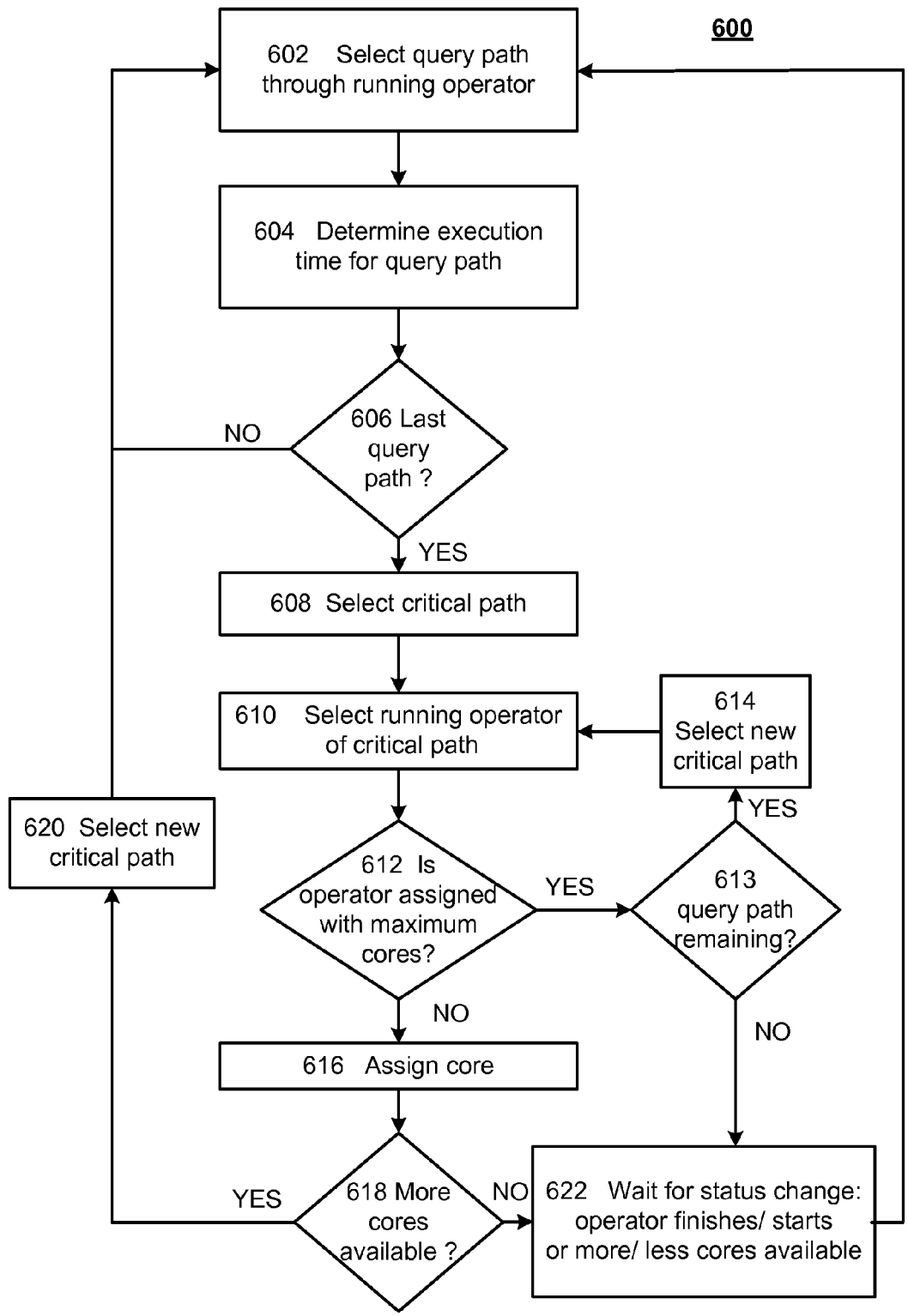
FIG. 6 is a flowchart illustrating example operations for executing the query of FIG. 3, using the system of FIG. 1.

FIG. 6 is a flowchart 600 illustrating example operations for executing the query 106 in the context of the example of FIG. 3, using the system of FIG. 1. That is, FIG. 6 illustrates more specific examples of FIG. 4 and operation 508 of FIG. 5, along with similar or analogous examples of operations 510-518 of FIG. 5.

In FIG. 6, then, it is assumed that a query processing plan has been selected and a resulting number of cores has been assigned to the query 106, e.g., the six cores 318-328 of FIG. 3. Then, to begin determining a critical path of the query 106, a (first) query path is selected through a running operator of the query in question (602). For example, the critical path selector 142 may select the running operator 306.

Then, an (estimated) execution time for the query path may be determined (604). For example, the critical path selector may calculate the estimated execution time for each operator in the query path, using a currently-assigned number of cores for the running operator 306 and otherwise assuming a single core assigned to any non-running cores of the current query path.

More specifically, the execution time of one query may be determined by the execution costs of operators and their dependency with each other(s). An operator may be executed in different numbers of cores during runtime, making it potentially difficult to determine a precise execution cost of such an operator. Response time estimation is one technique used to predict response time before execution. In the present description and examples, an estimation referred to herein as the Estimation Execution Time (EET) is used. As just described, for the operators in a running set (e.g., actually running or ready to run), the EET may be calculated according to the reduction function and the number of occupied cores. For the operators which are blocked, the may be estimated as running with one core assignment. Thus, for each operator $op_i$ in an executing query Q, the runningSet contains all the operators which have been assigned cores. The following is a formal definition, in which $EET_i=f_{op}(n)$; if $op_i$ is in the runningSet of Q, or, alternatively, $EET_i=f_{op}(1)$; if $op_i$ is not in the runningSet of Q.

Thus, it may be seen that an assignment algorithm may generate inefficient arrangement for cores if it cannot estimate relatively accurate priorities of operators. One such attribute of a query tree that used accordingly herein to determine operator priorities the Critical Path (CP), forming, as described, a path from one of current running operators to the exit operator, of which the sum of computation costs is maximum. The length of CP (CPL) is defined as the sum of each operator's EET. Since the query is always a tree structure and the query execution is applied from leaf operators to exit operator, each path from one running operator $op_i$ to the exit one is unique. Suppose variable $op_{ij}$ represents a number j operator in the path from $op_i$ to the exit operator, and $n_i$ is the number of operators in its path, then the CPL is the maximum of the operators in the runningset of $EET_{ij}$ summed from j=0 to $n_i$.

If the last query path has not been reached (606), then the process of selecting query path(s) (602) and calculating their respective execution times (604) continues. Once the last query path is reached (606), the critical path may be selected (608), e.g., as the query path having the longest summed/total execution time.

The workload manager 146 may then select the running operator of the critical path (610), such as the running operator 306. The workload manager 146 may then consult the reduction function thereof (e.g., the reduction function 312) to determine whether a maximum number of cores has been assigned thereto (612). If not, then the core may be assigned (616) to the running operator of the critical path.

If so, however, then, if no query paths remain (613), then the status monitor 140 may be tasked with waiting for any status change (622), such as a completing/starting query or operator and/or newly-available core. As shown, if any query paths do remain (613), a new critical path may be selected (614), such as a next-longest one of the determined query paths. Again, the workload manager 146 may check the corresponding reduction function to determine whether maximum cores have been assigned thereto (612). Once the result of this analysis determines the maximum has not been reached (612), then a core may be assigned (616).

If more cores are available for assignment (618), a new critical path may be selected (620), and the process continues with selection of an entirely newly-calculated critical path including recalculation of available query paths (602-608). Otherwise, again, the status monitor 140 may await a status change (622).

The workload manager 146 may thus perform assignment of core(s) to the running operator of the critical path. To improve the elapsed time of one running query, the described techniques may be used which assign more available cores to the operators in the CP. Specifically, the execution length is thus decreased by shorting the CPL of this query. In other words, the operators in CP are set to hold the highest priority relative to other ready ones. Thus, the described incremental, greedy algorithm may be used to assign cores to the running and ready operators in the relevant query tree.

Since the CP may change after one such assignment, an in order to avoid assigning cores to less important operators before the important ones, operator priorities may be determined dynamically during the assignment process, e.g., during runtime. Specifically, the priorities of operators are recomputed after one operator has been assigned, so that, as already described, the following three steps are repeatedly executed. Specifically, the CP of the running query is determined, a core is assigned to the running operator in CP, and the execution length from above operator to root operator is recalculated. A corresponding algorithm for performing these techniques is the Balanced Critical Path described herein, which involves balancing the execution cost of each operator which is located on the top of every potential CP. The special case described herein results when one running operator in CP has been fully-assigned. According to the corresponding reduction function, then, any new core assignment thereto will only decrease the elapsed time without any benefit. Thus, the new core is not assigned to it, and the CP this operator belongs to may be excluded from the BCP algorithm accordingly. Specific examples of the BCP algorithm is provided below with respect to Algorithm 3.

Figure 7A:
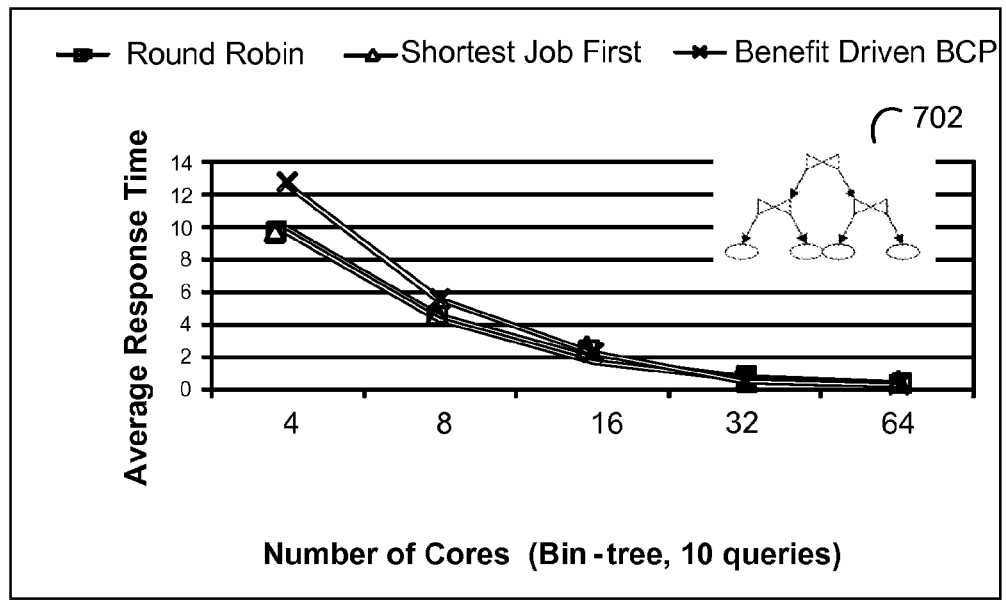
FIGS. 7A and 7B are graphs showing example results of the operations of FIG. 5.
Figure 7B:
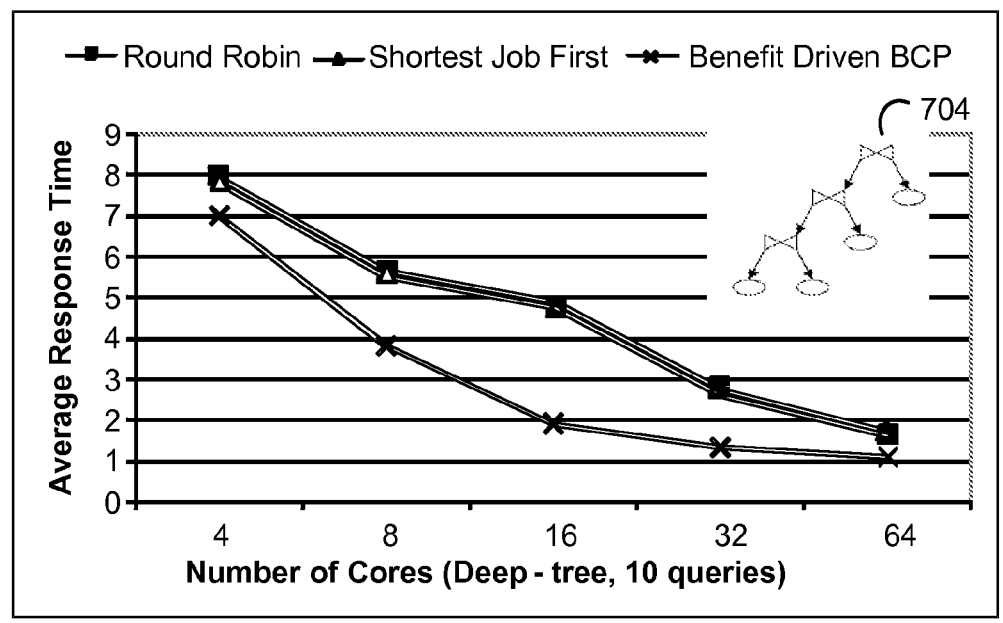

FIGS. 7A and 7B are graphs showing example results of the operations of FIG. 5. As already described, e.g., with respect to FIGS. 1, 2, and 5 (e.g., operation 504), they query manager 132 may be configured to select a query execution plan, such as SRJF or BD-BCP.

In this regard, as described herein, a query is represented as a tree of database operators, where each edge indicates the dependency between the operators. As shown in FIGS. 1 and 3, each edge represents a dependency between two operators. For example, in FIG. 1, operator 124 cannot be evaluated before operator 120 and operator 122 have been evaluated. Formally, a query Q=(OP, D) is defined as a tree with a set of operators OP as well as a set of dependencies D between the operators. Queries may be modeled as online arrival queries having an unbounded sequence of (query, time stamp) pairs, so that OAQ={$(Q_1, t_{s1}), (Q_2, t_{s2}), \ldots$}. Then, assuming N cores with the same computational capability as one another, a notation may be used in which cores are denoted as C={$c_1, c_2, \ldots, c_N$}.

Thus, as described, given a set of N cores C={$c_1, c_2, \ldots, c_N$}, the online arrival queries OAQ={$(Q_1, t_{s1}), (Q_2, t_{s2}), \ldots$}, the reduction function of each operator in the queries, and a shape/characteristic of the query tree(s), among other possible characteristics, the query scheduler 102 may decide how to assign cores to different queries, to different operators within a query, as well as the number of cores assigned to a single operator, so that the average response time of the queries is minimized (or other appropriate performance metric is optimized).

For purposes of explaining the examples of FIGS. 7A/7B and 8A/8B, reference is made to two specific types of query tree structures, i.e., deep-tree queries and binary-tree queries. An example of a binary-tree query is shown as element 702 in FIG. 7A. In a binary-tree query, all the no-leaf nodes in the query tree are organized by join operators. Each leaf node is presented by a table scan operator. Number of levels in a binary-tree query can be specified [$\log_2 N$]. This type of query can be regarded as an example of a bushy tree query, which many database management systems support and which provide opportunity for inter-operator parallelization. Meanwhile, in a deep-tree query, an example of which as shown as element 704 in FIG. 7B, a main body of the query is organized as a chain of join operators by one entry with one exit. The other entry of join is, e.g., a table scan operator. A number of levels in a deep-tree query can be specified as [N/2], where N in this context refers to the number of operators in the query tree. In FIGS. 7A and 7B, the example query trees show examples where N=7.

Using the above notation and motivation, it may be appreciated that the intention of Shortest Remaining Job First (SRJF) algorithm, as described above with respect to FIG. 2, is to feed as many available cores as possible to the query which is estimated to be finished in the shortest time. Accordingly, at the beginning of the core assignment, for each query, the finish time may be estimated by its CPL. Then, after choosing the right query with shortest CPL, the query scheduler 102 may attempt to assign all available cores thereto, in order to decrease the execution time of this query as much as possible. If there are still available cores, the next shortest query is chosen to be assigned. This process continues until the cores are exhausted or all queries become fully assigned. When subsequently assigning cores to a single query, the BCP algorithm described herein may be applied.

As an intended result of the SRJF algorithm, which attempts to minimize the execution time of the comparatively shortest query by assigning more cores to it, a sum of waiting time for each query is relatively short, and, each query's response time (which is the sum of the above two times) becomes also short. Queries other than the shortest query still can be assigned cores if the shortest query is in a full core assignment status.

Algorithm 1 describes the pseudo code of SRJF. The inputs of SRJF contain the set of running queries and the number of available cores. Since each query is online arrived with its time stamp, as described above, the queries with larger time stamps than current time line are not included in the running queries, and the same applies to some queries which have been finished after one round of running. Further, available cores are defined all available cores except for, these occupied by other applications, and some exclusive operators in running queries. The output of SRJF is a updated set of running queries which have been assigned with some available cores.

Algorithm 1

```
 1:  FUNCTION SRJF
 2:  IN: QS, running query set as input
 3:  IN: N , the number of available cores
 4:  OUT: QS, running query with core assignment as output
 5:  BEGIN
 6:    QuerySet FQS := φ
 7:    while (N ≧ 0) and (QS is not φ) do
 8:      Query ShortestQuery
 9:      Length CPL := 0
10:      for each Query_i in QS do
11:        Length CPL_i := EstimateCPL(Query_i)
12:        if (CPL ≦ CPL_i) then
13:          CPL := CPL_i
14:          ShortestQuery := Query_i
15:        end if
16:      end for
17:      BCP(ShortestQuery)
18:      bool status := CheckFullyAssigned(ShortestQuery)
19:      if (status) then
20:        QS := QS − ShortestQuery
21:        FQS := FQS + ShortestQuery
22:      end if
23:    end while
24:    QS := QS + FQS
25:    return QS
26:  END
```

As essentially described with respect to FIG. 5, in Algorithm 1, line 7 declines the return condition, that is, either no available core or each query in running query set is fully assigned, at which point one round of dynamic scheduling process is finished. From line 10 to line 16, the query with shortest remaining job is identified. Note that such identification is based on the reasonable estimation of critical path, as described herein. Line 17 tries to assign available cores to the relevant query using the BCP algorithm. If such assignment is successful, the number of available cores will be reduced accordingly, and the assigned query may be updated with a new status (e.g., update its runningSet of queries with the new assignment(s)). Line 18 uses a function to check whether a query has been fully assigned. That is, if each operator in the running set of the relevant query is under the condition of full assignment, the status is set as true, otherwise it is set to false. The block from line 19 to 22 indicate that the query should be moved from input running queries set (QS) to fully assigned query set (FQS) if such query has been fully assigned. After completing the assigning process, all running queries in both QS and FQS should be combined in line 24 and then returned as an updated running query in line 25.

Since SRJF prefers to assign one query with maximum cores, intra-operator and inter-operator (within a query) parallelism is encouraged as much as possible. However, this inclination may introduce more intra-operator parallel overhead, and, as a result, computing resources of the system may be consumed with respect to, e.g., synchronization, communication, and contention. To use in conjunction with the SRJF, then, the BD-BCP algorithm may be used.

The intention of BDBCP is to maximize the benefit of each core assignment in the query level. That is, the algorithm chooses the query which holds the most reduction (benefit) of CPL to assign the cores, as described above with respect to FIG. 2. In each step of assigning one core, all the reduction data of queries may be pre-calculated with a simulation that this core was assigned. Then, the operator which brings the best benefit is selected to be really assigned.

As already described with respect to FIG. 5, the process continues until all available cores are exhausted or all queries become fully assigned. Formally, the benefit gain $\Delta_i$ may be defined for query Qi in query set OAQ. Then, if the running operator op in critical path CPi is fully assigned, $\Delta_i$ is 0. Otherwise, if op has been assigned with m cores and is not fully assigned, $\Delta_i = (fop(m) - fop(m+1))$.

In one particular scenario, it may occur that all the benefit gain of a query in OAQ is the same as zero, that is, the operator op in each CPi is in the fully assigned state. To break the tie, the path which occupies a length less than CP but longer than other paths may be chosen as the new CP. This rule may be applied recursively until the finishing condition(s) of assignment is/are achieved.

Algorithm 2, below, describes an example pseudo code of BD-BCP. The inputs and output contain the set of running queries and the number of available cores, just as in the SRJF algorithm. The major difference is located from line 10 to line 19, wherein, in BD-BCP strategy, the candidate query is selected by the difference of benefit gains on the critical path instead of the length of the critical path as in SRJF.

Furthermore, assigning granularity is different between the two algorithms 1 and 2. Specifically, for example, line 20 describes that the assignment in BD-BCP is under a fine granularity which picks up one core and assigns to candidate query. While, in SRJF, cores as much as needed are assigned to one query in one step.

Then, as in the SRJF algorithm of Algorithm 1, from lines 21 to 25, fully assigned queries are checked and moved from input running queries set (QS) to fully assigned query set (FQS). Then, after completing the assigning process, all running queries may be combined as an updated running query set.

In each step of the assignment(s), BD-BCP attempts to apply the core to the query which can reduce the execution time the most. For example, such an assignment may achieve the most benefit by reducing the parallelism overhead. Consequently, the BD-BCP algorithm of Algorithm 2 does not prefer intra-operator, inter-operator nor inter-query parallelism. Nonetheless, it may be observed that the BD-BCP algorithm pays more attention to the inter-query scenario(s) as compared with the SRJF algorithm, since every query has the opportunity for a core assignment in each step.

Algorithm 2

```
1:   FUNCTION BC-BCP
2:   IN: QS, running query set as input
3:   IN: N , the number of available cores
4:   OUT: QS, running query with core assignment as output
5:   BEGIN
6:   QuerySet FQS := φ
7:   while (N ≧ 0) and (QS is not φ) do
8:       Query TargetQuery
9:       DeltaLength DeltaCPL := 0
10:      for each Query_i in QS do
11:          Length CPL_i := EstimateCPL(Query_i)
12:          Query TempQuery := Query_i
13:          AssignOneCoreOnCP(TempQuery)
14:          Length LowerCPL_i := EstimateCPL(TempQuery)
15:          if (DeltaCPL ≦ CPL_i - LowerCPL_i) then
16:              DeltaCPL := CPL_i - LowerCPL_i
17:              TargetQuery := Query_i
18:          end if
19:      end for
20:      AssignOneCoreOnCP(TargetQuery)
21:      bool status := CheckFullyAssigned(TargetQuery)
22:      if (status) then
23:          FQS := FQS + TargetQuery
24:          QS := QS - TargetQuery
25:      end if
26:  end while
27:  QS := QS + FQS
28:  return QS
29:  END
```

From the discussion above, it may be observed that the performances of the SRJF and BD-BCP algorithms may be impacted by several factors (e.g., the number of available cores, the number of queries, or the number of operators within a query, to name a few). Particularly for online arrival queries, such factors may change quickly and continuously over time. Thus, due to different query shapes and system snapshots, different parallel scheduling strategies may be applied most advantageously.

In the following, analysis and discussion of the complexity of parallel multiple query scheduling is presented. In particular, a manner in which the factors influence the performance of the SRJF algorithm are discussed. In the online arrival scenario, the idea of the SRJF algorithm includes selecting a "shortest remaining" query, and subsequent assignment of as many cores as possible to make this query finish as early as possible.

At least two factors impact its performance: the number of cores and the number of queries/operators. Regarding the number of cores, it may be appreciated that the SRJF algorithm generally aims at arranging for queries an execution sequence such that the average response time for the queries overall is minimized. This is generally true when the number of cores is relatively small, since, for example, lower numbers of cores implies less overhead if all available cores are assigned to the shortest query. The extreme case in this scenario is when the number of cores=1, in which no parallelism can be leveraged and SRJF will generally perform better than the BD-BCP algorithm. On the other hand, if the number of cores is quite large, since the SRJF algorithm selects the shortest query and assigns as many cores as possible to that query, the parallelization overhead of that query may overwhelm the benefit such scheduling. Further, such strategy also overlooks the fact that some of the cores assigned to the shortest query may gain much more benefit if they are assigned to other queries for inter-query parallelism.

Regarding the number of queries/operators, it may be observed that the key consideration of the SRJF algorithm's performance is the parallelization overhead introduced by assigning too many cores to the shortest query. The overhead generally comes from over-parallelizing the operators within the query. Thus, if the number of operators in the query is very small, in average, each operator will be assigned more cores, and this will probably result in intra-operator overparallelization. On the other hand, if the number of operators within the shortest query is large, those cores assigned to the query by the SRJF algorithm are likely to be assigned to different operators within the query (note that the BCP algorithm implemented within a single query tends to assign cores to different operators within a query if assigning them to a single operator will cause too much intra-operator parallelization overhead). In this case, the intra-operator overparallelization may be avoided.

In summary, both the above two factors can influence the performance of the SRJF algorithm. Fixing the number of cores, and varying the number of operators per query will thus cause the performance of the SRJF algorithm to vary. Similarly, when fixing the number of operators in a query, a different number of cores may have a performance impact.

In comparison, the BD-BCP algorithm may be affected differently by the same or different factors. For example, as described above, each time a core is to be assigned, the BD-BCP algorithm selects a query which can result in the most response time reduction and assigns the core to it.

Thus, with respect to the number of cores available, and different from the SRJF strategy, the nature of the BD-BCP strategy relates to selecting a query which can maximize response time reduction at the current step, which is a local optimization. The status later on may turn out to be quite different from the current estimation. Such situations may get even worse if there are limited number of cores available, because the critical path length estimation in the BCP algorithm itself (as described above and illustrated below specifically with respect to Algorithm 3) may be inaccurate when a number cores is relatively small. Therefore, for a smaller number of cores, the performance of the BD-BCP algorithm may degrade due to inaccurate estimation. Further, as compared to the SRJF algorithm, the BD-BCP algorithm tends to assign cores to different queries, so that the assigned queries may be executed for a relatively long, time. When the number of cores is small, many other queries may be waiting for these long-lasting queries, so that the average response time of the total queries may turn out to be relatively long. On the other hand, if the number of cores is sufficient (neither too few nor too many), the critical path estimation of the BCP algorithm may be more accurate and stable, which will contribute to the stability of the BD-BCP algorithm as a whole.

With respect to the number of operators, it may be observed that the BD-BCP algorithm considers all ready operators together, and chooses the operator (using BCP algorithm) that can maximize response time reduction among all queries. If the number of cores available is fixed, varying the number of currently ready operators can also influence the performance of the BD-BCP algorithm as a whole. That is, larger number of operators here may imply less stability of the BCP algorithm, as well as of the BD-BCP algorithm itself.

Table 1, below, summarizes a strategy based on the above analysis for multiple query scheduling. Table 1 shows that the BD-BCP algorithm is suitable for the database management systems which tend to generate deep-tree queries. The SRJF algorithm is recommended for database management systems which tend to generate the binary-tree queries In general, as shown in Table 1, when using deep-tree queries with fewer cores and low parallelism overhead, or when using binary-tree with mean (i.e., sufficient) cores and high parallelism overhead, the performance between BD-BCP and SRJF is competitive. For all the multiple query scheduling, with sufficient cores, the performance of all the described techniques becomes very similar, because, with large number of cores, all available operators are assigned with enough cores and running under the full parallelism condition. For multiple query scheduling, the performances of SRJF and BD-BCP are dramatically impacted by several factors. Consequently, it may be observed that it is difficult for one such strategy to provide the best performance under all environments. Rather, for binary-tree queries, SRJF presents better performance, due, e.g., to less overhead consumption. Meanwhile, BD-BCP is more suitable for deep-tree queries due to its inter-query parallelization without much overhead consumption.

TABLE 1

| #Cores | Deep-tree query | | Binary-tree query | |
| --- | --- | --- | --- | --- |
| | parallelism overhead | | | |
| | Low | High | Low | High |
| Lack | Competitive | BD-BCP | SRJF | SRJF |
| Mean | BD-BCP | BD-BCP | SRJF | Competitive |
| Sufficient | Equal | Equal | Equal | Equal |

Examples of the above discussion are shown with respect to FIGS. 7A and 7B. Specifically, FIG. 7A illustrates that for a binary type tree 702, the SRJF algorithm provides better results in reducing an average response time, particularly when the number of cores is smaller, relative to either the BD-BCP algorithm or a conventional round-robin approach in which cores are assigned to queries consecutively and evenly. On the other hand, FIG. 7B shows that for a deep-tree type query 704 the BD-BCP algorithm is superior in reducing an average response time, as compared to the SRJF algorithm and the conventional round-robin algorithm. Similar graphs could be constructed to illustrate the effects of greater or smaller number of queries/operators for each algorithm and query tree type in reducing the average response time, according to the discussion above.

Figure 8A:
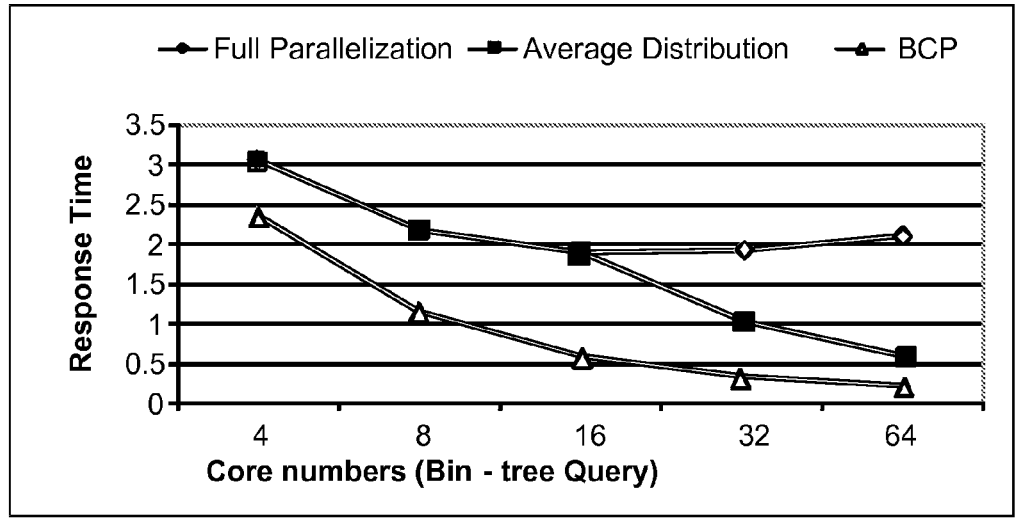
FIGS. 8A and 8B are graphs showing example results of the operations of FIG. 6.
Figure 8B:
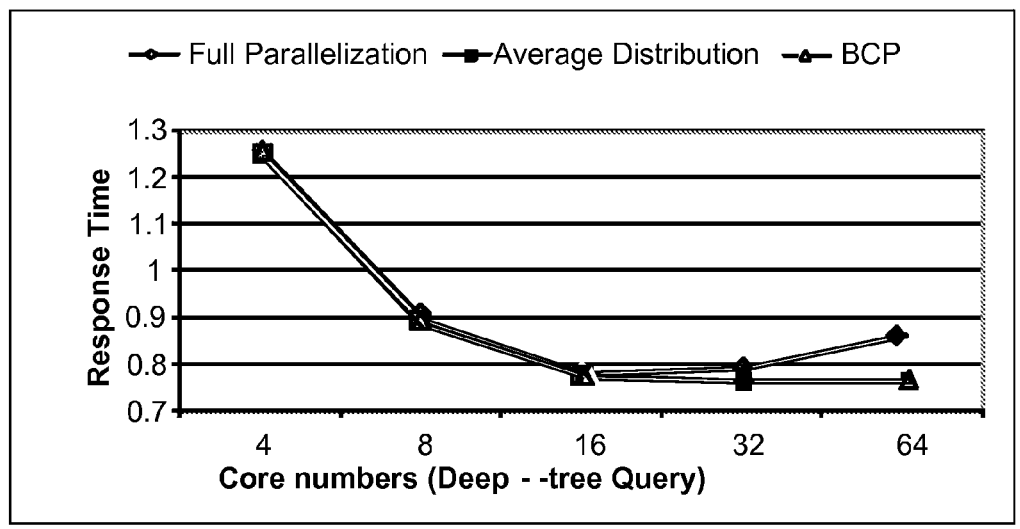

FIGS. 8A and 8B are graphs showing example results of the operations of FIG. 6. That is, the FIGS. 8A and 8B illustrate examples of the BCP algorithm described above with respect to FIGS. 1, 3, 4, and 6, an example of pseudo code thereof is provided below as Algorithm 3.

As explained in detail above, the BCP algorithm relies on the fact that the maximum speedup of one query in parallel execution is potentially determined by its serial part, so that more cores may be assigned to the serial part in order to reduce its execution time. In this regard, both the serial part in one query and an estimation of its execution time may be determined as part of the BCP algorithm In algorithm 3, the inputs of BCP contain running queries and the number of available cores. During the query running, the input query may be re-scheduled by this algorithm when any status is updated, where such status updates, as described, may refer to a status inside a query (e.g., some running operators finish and awake others) and to status outside a query (e.g., some cores may become available since other applications release them). The output of the BCP algorithm is an updated running query which has been assigned with some available cores.

Line 8 defines that the finish condition is either all available cores assigned or each operator assigned with maximum cores. From line 11 to line 17, the operator which is located on the critical path is selected. Line 18 attempts to apply one core to the selected operator. If the operator is in the condition of maximum cores, the assignment returns false, otherwise, returns true. And, inside this function, if the assignment is successful, the EET of this operator is updated according to its reduction function.

With the result of assignment, either the operator is moved from candidate running set (RS) and to fully assigned running set (FRS) as described in line 22, 23, or it consumes one core as described in line 20. After the assignment algorithm is finished, all the operators in both RS and FRS may be combined in line 26 and then, sent back to a running query in line 27. For each assignment of available core, the CPL is calculated based on the EET of each operators in running set.

---

Algorithm 3

```
1:   FUNCTION BCP
2:   IN: Q, running query as input
3:   IN: N , the number of available cores
4:   OUT: Q, running query with core assignment as output
5:   BEGIN
6:       RunningSet RS := GetRunningSet(Q)
7:       RunningSet FRS := φ
8:       while (N ≧ 0) and (RS is not φ) do
9:           Operator opOnCP
10:          Length CPL := 0
11:          for each op_i in RS do
12:              Length PL_i := the sum of operators EET from op_i to
                     root operator
13:              if (PL_i ≧ CPL) then
14.                  CPL := PL_i
15:                  opOnCP := op_i
16:              end if
17:          end for
18:          Bool status := AssignOneCore(opOnCP)
19:          if (status) then
20:              N := N − 1
21:          else
22:              RS := RS − opOnCP
23:              FRS := FRS + opOnCP
24:          end if
25:      end while
26:      RS = RS + FRS
27:      SetRunningSet(Q, RS)
28:      return Q
29:  END
```

---

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions recorded on a non-transitory computer-readable medium, the system comprising:
an operator manager configured to determine a number of available cores and to assign the cores among a plurality of operators of a query, the operators including a running set of operators through which a plurality of query paths exist, the operator manager including
a status monitor configured to determine the number of available cores and to determine the running set of operators,
a critical path selector configured to determine a critical path of the query from among the query paths and the running set of operators, and
a workload manager configured to assign a first core of the available cores to a running operator of the running set and of the critical path, and to thereafter receive a new critical path from the critical path selector and to assign a second core of the available cores to the running operator of the new critical path.

2. The system of claim 1, wherein the critical path selector is configured to determine the critical path including summing operator execution times of operators of each query path, and thereafter selecting the critical path as having a largest summed execution time of the query paths.

3. The system of claim 2, wherein the critical path selector is configured to determine the new critical path by re-calculating summed operator execution times for each query path after the assignment of the first core to the running operator of the running set and of the critical path, and selecting the new critical path as having the largest summed execution time of the query paths.

4. The system of claim 1, wherein the critical path selector is configured to determine the new critical path including:
calculating summed operator execution times for each query path after the assignment of the first core to the running operator of the running set and of the critical path;
determining a potential critical path for assignment of the second core to a running operator of the running set and of the potential critical path, the potential critical path having the largest summed execution time of the query paths;
determining from the workload manager that the assignment of the second core to the running operator of the running set and of the potential critical path would not provide a net benefit in the execution time thereof; and
determining the new critical path as having the second-largest summed execution time of the query paths.

5. The system of claim 1, wherein the workload manager is configured to assign the first core including determining from a reduction function of the running operator of the running set and of the critical path that the assignment of the first core will result in a net reduction in execution time thereof.

6. The system of claim 1 wherein the operator manager is configured to continue to assign the available cores to the running operators of the query paths until the workload manager determines that, according to reduction functions of the running operators, assignment of any available core to any of the running operators would not result in a decrease in the execution times thereof.

7. The system of claim 1, wherein the status monitor is configured to detect a state change including a newly-available or unavailable core, a start or completion of a running operator of the query, and configured to stop or start operations of the operator manager based on the state change.

8. The system of claim 1, comprising:
a query manager configured to determine a plurality of queries, including the query, wherein the query manager includes
a query selector configured to determine a total number of available cores and configured to assign the available cores of the total number of available cores to the operator manager for parallel processing of the query therewith; and
a query monitor configured to monitor the plurality of queries to determine a state thereof.

9. The system of claim 8, wherein the query selector is configured to determine a tree shape associated with the plurality of queries and to determine a multi-query processing algorithm based thereon and on the total number of available cores.

10. The system of claim 9, wherein the query selector is configured to implement the multi-query processing algorithm including a Shortest Remaining Job First (SRJF) algorithm, according to which the query monitor selects the query from the plurality of queries as having the shortest remaining time to finish, and the query selector assigns the available cores to the query for use by the operator manager in parallel processing thereof.

11. The system of claim 9, wherein the query selector is configured to implement the multi-query processing algorithm including a Benefits Driven Balanced Critical Path (BD-BCP) algorithm, according to which a loop is executed in which the query monitor selects the query from the plurality of queries as having the largest benefit experienced from assigning a core thereto, and the query selector assigns a first core to the query, whereupon the loop continues with selection by the query monitor of a next query having the next largest benefit experienced from assigning a core thereto from the plurality of available cores.

12. The system of claim 1, wherein the running set of operators include each running operator of the query within each parallel thread of the query, wherein a path from each such running operator to the end of the query is included in the plurality of query paths.

13. A computer-implemented method comprising:
determining a query including a plurality of operators, the operators including a running set of operators through which a plurality of query paths exist;
determining a number of available cores;
determining a critical path of the plurality of query paths, based on a total execution time of each of the plurality of query paths;
assigning a first one of the available cores to a first operator within the running set and within the critical path;
determining a new critical path through the plurality of query paths, based on the assigning; and
assigning a second one of the available cores to a second operator within the running set and the new critical path.

14. The method of claim 13, wherein determining the critical path comprises:
summing operator execution times of operators of each query path; and
selecting the critical path as having a largest summed execution time of the query paths.

15. The method of claim 13 wherein assigning the first one of the available cores comprises determining from a reduction function associated with the first operator within the running set and within the critical path that assignment of the first one of the available cores thereto will result in a reduced execution time thereof.

16. The method of claim 13, wherein determining the new critical path comprises:
- calculating summed operator execution times for each query path after the assignment of the first one of the available cores to the first operator within the running set and within the critical path;
- determining a potential critical path for assignment of the second one of the available cores to a running operator of the running set and of the potential critical path, the potential critical path having the largest summed execution time of the query paths;
- determining that the assignment of the second one of the available cores to the running operator of the running set and of the potential critical path would not provide a net benefit in the execution time thereof; and
- determining the new critical path as having a next-largest summed execution time of the query paths.

17. The method of claim 13, wherein determining the query comprises:
- determining the query from a plurality of queries;
- determining a total number of cores; and
- determining that the query has the shortest remaining time to finish of the plurality of queries; and
- assigning the available cores of the total number of cores to the query, based on the determining that the query has the shortest remaining time to finish.

18. The method of claim 13, wherein determining the query comprises:
- determining the query from a plurality of queries;
- determining a total number of cores;
- projecting, for each of the plurality of queries, a benefit length associated with a reduction in query execution time as caused by the assignment of at least one core of the total number of cores to each query for processing therewith;
- assigning at least one core of the total number of cores to the query, based on the projecting;
- re-projecting the benefit length for each of the plurality of queries, based on the assigning; and
- assigning at least a second core of the total number of cores to the query, based on the re-projecting, the first and second cores of the total number of cores thus forming the available cores for the query.

19. A computer program product, the computer program product being tangibly embodied on a non-transitory computer-readable medium and comprising instructions that, when executed, are configured to:
- determine a query including a plurality of operators, the operators including a running set of operators through which a plurality of query paths exist;
- determine a number of available cores;
- determine a critical path of the plurality of query paths, based on a total execution time of each of the plurality of query paths;
- assign a first one of the available cores to a first operator within the running set and within the critical path;
- determine a new critical path through the plurality of query paths, based on the assigning; and
- assign a second one of the available cores to a second operator within the running set and the new critical path.

20. The computer program product of claim 19, wherein the critical path is determined by:
- summing operator execution times of operators of each query path; and
- selecting the critical path as having a largest summed execution time of the query paths.

21. The computer program product of claim 19, wherein the first one of the available cores is assigned by determining from a reduction function associated with the first operator within the running set and within the critical path that assignment of the first one of the available cores thereto will result in a reduced execution time thereof.

* * * * *